(12) United States Patent
Baik

(10) Patent No.: US 12,242,082 B2
(45) Date of Patent: Mar. 4, 2025

(54) LIQUID LENS AND CAMERA MODULE COMPRISING SAME

(71) Applicants: LG INNOTEK CO., LTD., Seoul (KR); CORNING INCORPORATED, Corning, NY (US)

(72) Inventor: Jung Shik Baik, Seoul (KR)

(73) Assignees: LG INNOTEK CO., LTD., Seoul (KR); CORNING INCORPORATED, Corning, NY (US)

( * ) Notice: Subject to any disclaimer, the term of this patent is extended or adjusted under 35 U.S.C. 154(b) by 638 days.

(21) Appl. No.: 17/595,822

(22) PCT Filed: May 22, 2020

(86) PCT No.: PCT/KR2020/006724
§ 371 (c)(1),
(2) Date: Nov. 24, 2021

(87) PCT Pub. No.: WO2020/242149
PCT Pub. Date: Dec. 3, 2020

(65) Prior Publication Data
US 2022/0163703 A1 May 26, 2022

(30) Foreign Application Priority Data
May 24, 2019 (KR) .................. 10-2019-0061487

(51) Int. Cl.
*G02B 3/14* (2006.01)
*G02B 7/02* (2021.01)
(Continued)

(52) U.S. Cl.
CPC .............. *G02B 3/14* (2013.01); *G02B 7/028* (2013.01); *G03B 17/55* (2013.01); *H04N 23/55* (2023.01)

(58) Field of Classification Search
CPC ........ G02B 3/14; G02B 7/028; G02B 27/646; G02B 2207/115; G02B 7/021; G02B 7/04;
(Continued)

(56) References Cited

U.S. PATENT DOCUMENTS 8,027,096 B2 * 9/2011 Feng .................. G02B 3/14
359/666
2008/0277480 A1 * 11/2008 Thuries .............. G06K 7/10811
359/666
(Continued)

FOREIGN PATENT DOCUMENTS

JP 2008-304792 A 12/2008
JP 2009-25523 A 2/2009
(Continued)

OTHER PUBLICATIONS

International Search Report dated Sep. 3, 2020 in International Application No. PCT/KR2020/006724.

*Primary Examiner* — Collin X Beatty
(74) *Attorney, Agent, or Firm* — Saliwanchik, Lloyd & Eisenschenk

(57) ABSTRACT

A liquid lens includes a first plate having a cavity for receiving a first liquid and a second liquid; a first electrode disposed on a first surface of the first plate; a second electrode disposed on a second surface of the first plate facing the first surface; and a temperature device disposed on the first surface of the first plate to be spaced apart from the individual electrode; wherein the first electrode includes first to eighth individual electrodes sequentially arranged along a circumferential direction about an optical axis, and wherein the temperature device includes at least one of a temperature sensor and a heater disposed between at least two individual electrodes of the first to eighth individual electrodes.

13 Claims, 16 Drawing Sheets

(51) Int. Cl.
*G03B 17/55* (2021.01)
*H04N 23/55* (2023.01)

(58) Field of Classification Search
CPC .......... G03B 17/55; G03B 3/10; G03B 30/00; G03B 2205/0084; G03B 17/12; H04N 23/55
See application file for complete search history.

(56) References Cited

U.S. PATENT DOCUMENTS

| | | |
|---|---|---|
| 2015/0049391 A1 | 2/2015 | Depfenhart |
| 2019/0377236 A1 | 12/2019 | Jang et al. |
| 2020/0096678 A1 | 3/2020 | Kaminski et al. |

FOREIGN PATENT DOCUMENTS

| | | | |
|---|---|---|---|
| KR | 10-2018-0087082 A | 8/2018 | |
| WO | 2018/187578 A2 | 10/2018 | |

\* cited by examiner

LIQUID LENS AND CAMERA MODULE COMPRISING SAME

CROSS-REFERENCE TO RELATED APPLICATIONS

This application is the U.S. national stage application of International Patent Application No. PCT/KR2020/006724, filed May 22, 2020, which claims the benefit under 35 U.S.C. § 119 of Korean Application No. 10-2019-0061487, filed May 24, 2019, the disclosures of each of which are incorporated herein by reference in their entirety.

TECHNICAL FIELD

An embodiment relates to a liquid lens and a camera module comprising the same.

BACKGROUND ART

A user of a portable device desires an optical device having a high resolution, a small size, and various photographing functions. For example, the various photographing functions may mean at least one of an optical zoom function (zoom-in/zoom-out), an auto-focusing (AF) function, or a handshaking correction or an optical image stabilizer (OIS) function.

In the case of the prior art, in order to implement the described various photographing functions, a method of combining several lenses and directly moving the combined lenses was used. However, when a number of lenses is increased as described above, the size of the optical device may increase.

The AF and OIS functions are performed by moving or tilting a plurality of lenses aligned with an optical axis while being fixed to the lens holder in the optical axis or a vertical direction of the optical axis. To this end, a separate lens driving device for driving a lens assembly composed of a plurality of lenses is required. However, the lens driving device consumes high power, and in order to protect it, there is a problem in that the overall size of the existing camera module is increased, such as having to add a cover glass separately from the camera module. In order to solve this problem, research on a liquid lens capable of performing AF and OIS functions by electrically controlling a curvature and an inclination of the interface between two liquids is being conducted.

DISCLOSURE

Technical Problem

An embodiment is to provide a liquid lens capable of controlling the temperature of the liquid lens, a camera module including the same, and a control method thereof.

The technical problem to be solved in the embodiment is not limited to the technical problem mentioned above, and another technical problem not mentioned will be clearly understood by those of ordinary skill in the art to which the present invention belongs from the following description.

Technical Solution

A liquid lens according to the embodiment comprises a first plate having a cavity for receiving a first liquid and a second liquid; a first electrode disposed on a first surface of the first plate; a second electrode disposed on a second surface of the first plate facing the first surface; and a temperature device disposed on the first surface of the first plate to be spaced apart from the individual electrode; wherein the first electrode includes first to eighth individual electrodes sequentially arranged along a circumferential direction about an optical axis, and wherein the temperature device includes at least one of a temperature sensor and a heater disposed between at least two individual electrodes of the first to eighth individual electrodes.

In addition, the first surface of the first plate includes: a first region; a second region facing the first region with respect to a center of the cavity; a third region between the first and second regions; and a fourth region facing the third region with respect to the center of the cavity, wherein an area of the first surface is greater than an area of the second surface.

In addition, the first to eighth individual electrodes includes a first group of four individual electrodes disposed in the first region; and a second group of four individual electrodes disposed in the second region; wherein the temperature device is disposed in at least one of the first to fourth regions.

In addition, the first to eighth individual electrodes includes a first group of two individual electrodes disposed in the first region, a second group of two individual electrodes disposed in the second region, a third group of two individual electrodes disposed in the third region, and a fourth group of two individual electrodes disposed in the fourth region, wherein the temperature device is disposed in at least one of the first to fourth regions.

In addition, the temperature device includes a first device disposed in the first region; a second device disposed in the second region; a third device disposed in the third region; and a fourth device disposed in the fourth region; wherein the first and second device are temperature sensors, and wherein the third and fourth device are heaters.

A camera module according to the embodiment comprises a holder including a solid lens; a liquid lens coupled to the holder; a main board connected to the liquid lens and comprising a controller for controlling the liquid lens; and an image sensor disposed on the main board at a position corresponding to the liquid lens, wherein the liquid lens comprises: a first plate having a cavity for receiving a first liquid and a second liquid; a first electrode disposed on a first surface of the first plate; a second electrode disposed on a second surface of the first plate facing the first surface; and a temperature device disposed on the first surface of the first plate to be spaced apart from the individual electrode; wherein the first electrode includes first to eighth individual electrodes sequentially arranged along a circumferential direction about an optical axis, wherein the temperature device includes at least one of a temperature sensor and a heater disposed between at least two individual electrodes of the first to eighth individual electrodes, and wherein the controller includes at least one of a temperature sensing portion connected to the temperature sensor to sense the temperature of the liquid lens and a heater controller connected to the heater.

In addition, the temperature sensor includes one end connected to the temperature sensing portion and the other end connected to a reference potential, and wherein the heater includes one end connected to the heater controller and the other end connected to the reference potential.

In addition, the temperature sensing portion includes a sensing driver configured to supply a driving signal to the one end of the temperature sensor; and a temperature information measuring part connected to the one end of the temperature sensor to measure temperature information of the temperature sensor.

In addition, the temperature sensor includes first and second temperature sensors facing each other with a center of the liquid lens interposed therebetween, wherein one end of the first temperature sensor is connected to the temperature sensing portion, wherein the other end of the first temperature sensor is connected to one end of the second temperature sensor, and wherein the other end of the second temperature sensor is connected to the reference potential.

In addition, the heater includes first and second heaters disposed to face each other with a center of the liquid lens interposed therebetween, wherein one end of the first heater is connected to the heater controller, wherein the other end of the first heater is connected to one end of the second heater, and wherein the other end of the second heater is connected to the reference potential.

In addition, the sensing driver includes at least one of a current source configured to supply the driving signal in the form of a current to connected to the one end of the temperature sensor and a load resistor connected between the driving signal in the form of a voltage and the one end of the temperature sensor.

In addition, a control method of the camera module comprises sensing a temperature of a liquid lens; detecting a difference between the sensed temperature and a set target temperature of the liquid lens; and applying power to the heater when there is a difference between the sensed temperature and the set target temperature of the liquid lens.

In addition, the control method further comprises maintaining a current state when there is no difference between the sensed temperature and the set target temperature of the liquid lens.

Advantageous Effects

According to the embodiment, it is possible to provide a liquid lens that can adjust the interface within the lens in which the focal length can be adjusted in 8 directions, and thus, Optical Image Stabilizer (OIS) can be more easily implemented.

In addition, according to the embodiment, there is no need to implement a long length between lines of the temperature sensor. Since the space between the lines is wide, there is little possibility that the lines are deformed by heat, and thus the structural design is simplified and the manufacturing process can be facilitated.

In addition, according to the embodiment, the temperature sensor or the heater is not disposed on a surface on which a common electrode is disposed. Accordingly, the influence on the common electrode that may occur due to the operation of the temperature sensor or the heater may be eliminated, and thus the stability of the operation may be secured.

In addition, by arranging the temperature sensor and the heater on the surface where individual electrodes having a relatively large bondable area for bonding between substrates constituting the liquid lens are disposed, it is possible to inhibit leakage of liquid and increase the bonding rigidity.

In addition, the effects obtainable in the present embodiment are not limited to the above-mentioned effects, and another effect not mentioned will be clearly understood by those of ordinary skill in the art to which the present invention belongs from the following description.

MODES OF THE INVENTION

Figure 1:
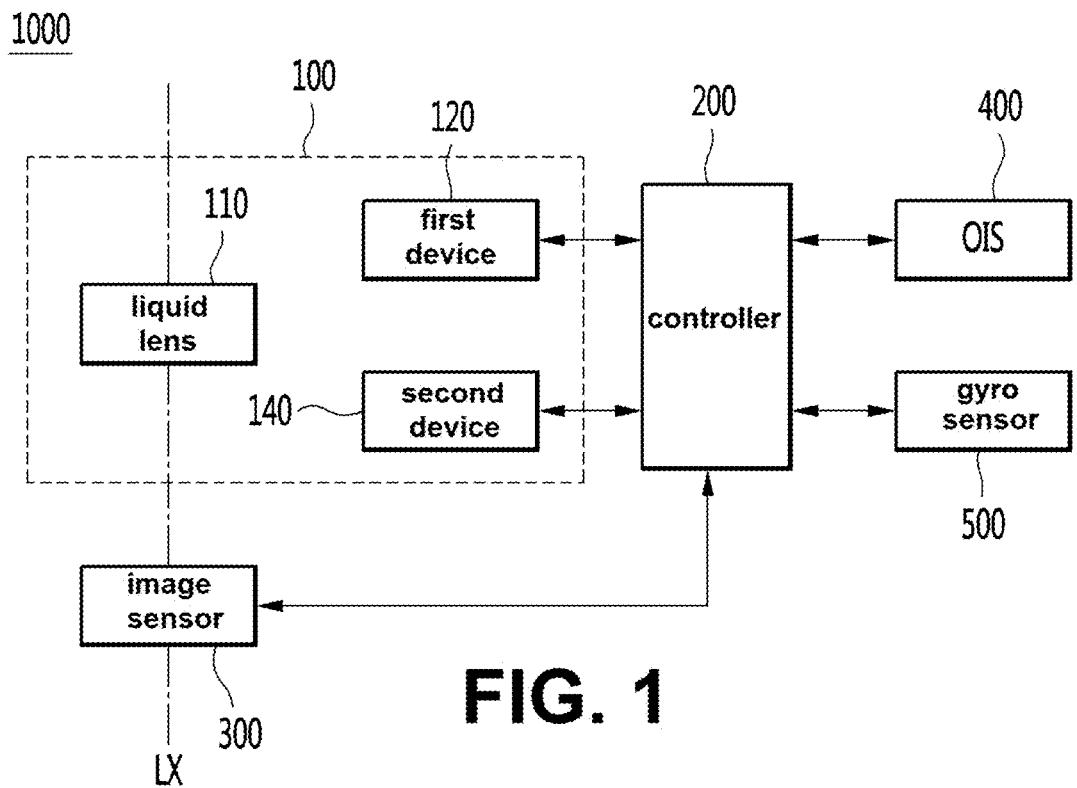
FIG. 1 is a schematic block diagram of a camera module according to an embodiment.

Hereinafter, preferred embodiments of the present invention will be described in detail with reference to the accompanying drawings.

However, the technical spirit of the present invention is not limited to some embodiments described, but may be implemented in various different forms, and, as long as it is within the scope of the technical spirit of the present invention, one or more of the components may be selectively combined and substituted between the embodiments.

In addition, terms (including technical and scientific terms) used in the embodiments of the present invention may be interpreted as meanings that can be generally understood by those of ordinary skill in the art to which the present invention pertains unless explicitly defined and described, and the meanings of commonly used terms such as predefined terms may be interpreted in consideration of the contextual meaning of the related art.

In addition, the terms used in the embodiments of the present invention are for describing the embodiments and are not intended to limit the present invention. In this specification, the singular may also include the plural unless specifically stated in the phrase. And, when it is described as "A and (and) at least one (or more than one) of B and C", it may include one or more of all combinations that can be combined with A, B, and C.

In addition, in describing the components of the embodiment of the present invention, terms such as first, second, A, B, (a), (b), etc. may be used. These terms are only used to distinguish the component from other components, and are not limited to the essence, order, or order of the component by the term.

And, when it is described that a component is 'connected', 'coupled' or 'contacted' to another component, the component is not only directly connected, coupled or contacted to the other component, but also with the component it may also include a case of 'connected', 'coupled' or 'contacted' due to another element between the other elements.

In addition, when it is described as being formed or disposed on "above (on) or below (under)" of each component, the above (on) or below (under) is one as well as when two components are in direct contact with each other. Also includes a case in which another component as described above is formed or disposed between two components. In addition, when expressed as "above (up) or below (under)", it may include not only the upward direction but also the meaning of the downward direction based on one component.

Hereinafter, camera modules 1000 and 1000A including a liquid lens according to an embodiment will be described with reference to attached drawings. For convenience, although the camera modules 1000 and 1000A are described using a Cartesian coordinate system (x-axis, y-axis, and z-axis), of course, this can also be described by other coordinate systems. In addition, according to the Cartesian coordinate system, the x-axis, the y-axis, and the z-axis are orthogonal to each other, but the embodiment is not limited thereto. That is, the x-axis, y-axis, and z-axis may intersect each other.

FIG. 1 is a schematic block diagram of a camera module according to an embodiment. Here, LX means an optical axis.

The camera module 1000 shown in FIG. 1 may comprise a liquid lens 110, a first device 120, a second device 140, a controller 200, an OIS 400, and a gyro sensor 500.

Although the first device 120 and the second device 140 are exemplified as belonging to a lens assembly 100 in FIG. 1, the embodiment is not limited thereto. That is, unlike shown in FIG. 1, the first device 120 and the second device 140 may not be components of the lens assembly 100, but may be components of the camera module 1000. In addition, the embodiment is not limited to a specific configuration of the lens assembly 100 in which the liquid lens 110 is included. An example of the lens assembly 100 will be described later with reference to FIG. 19.

Figure 2:
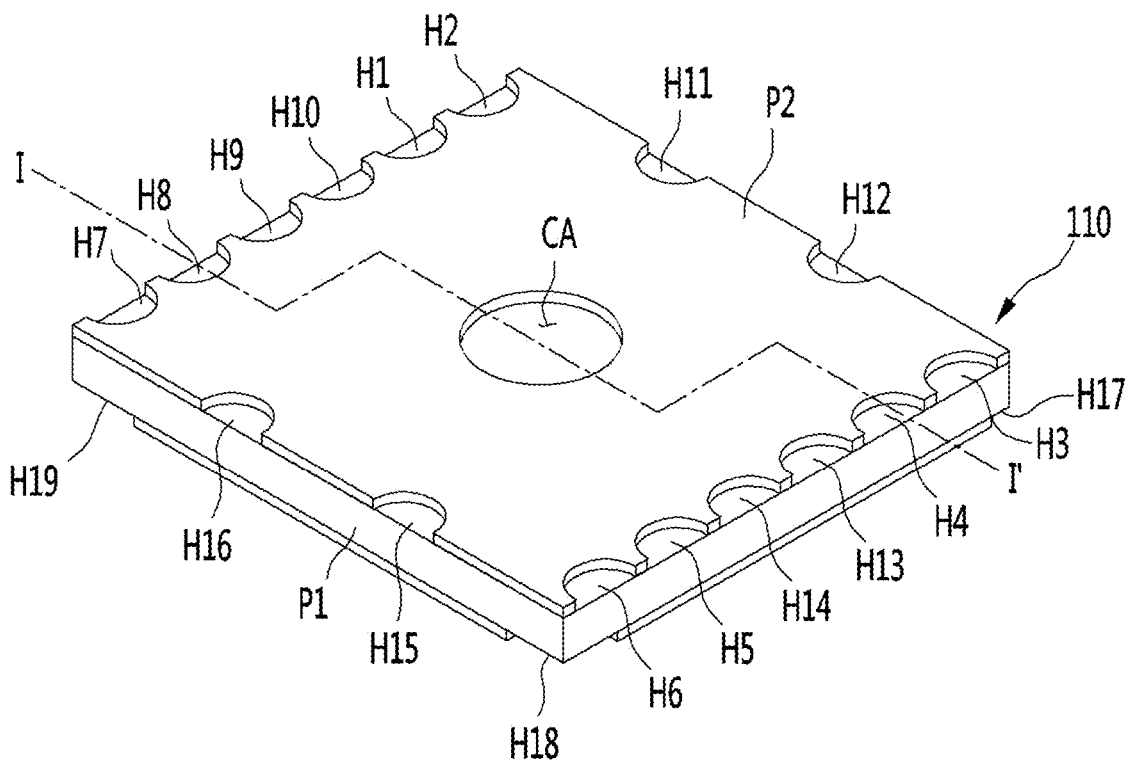
FIG. 2 is a perspective view of the lens assembly shown in FIG. 1 viewed from one side.
Figure 3:
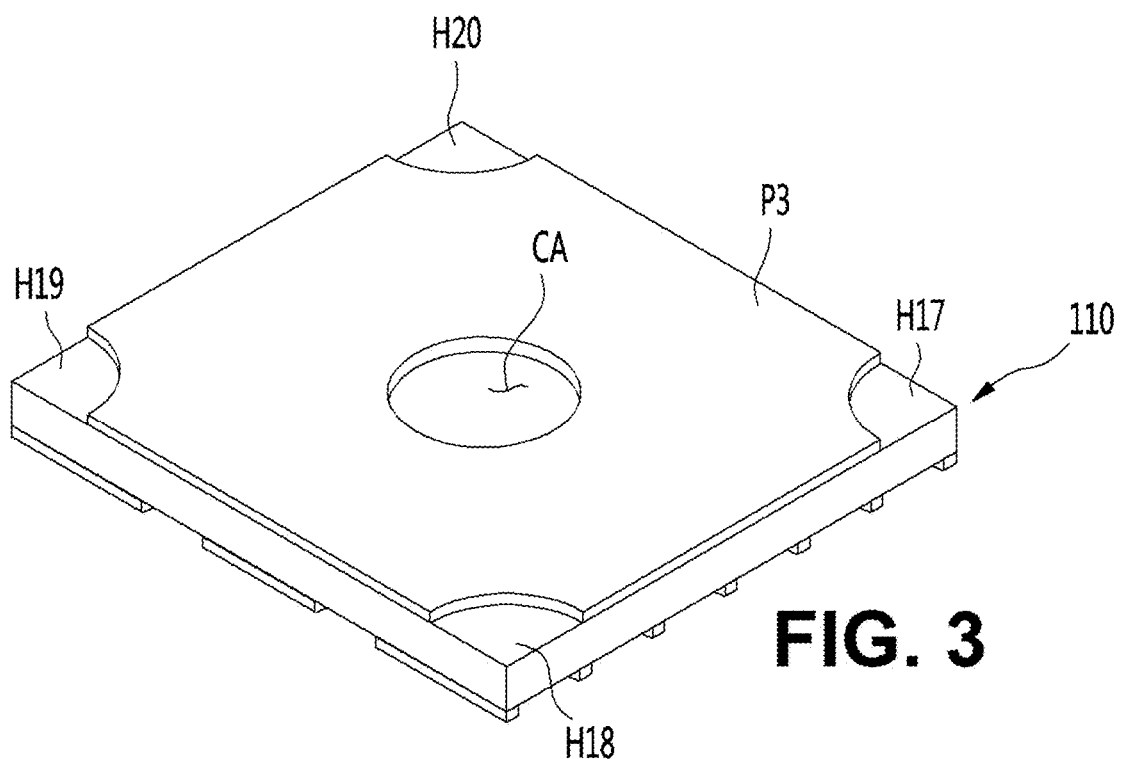
FIG. 3 is a perspective view of the lens assembly shown in FIG. 1 viewed from the other side.
Figure 4:
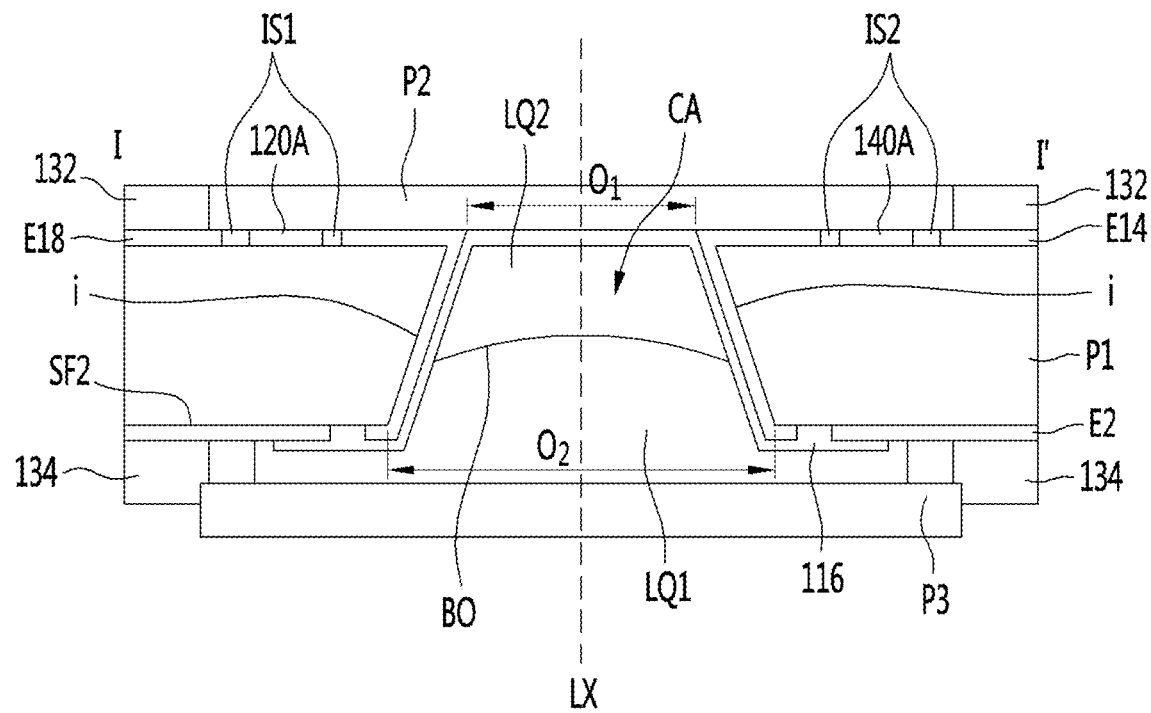
FIG. 4 is a cross-sectional view taken along line I-I' shown in FIG. 2.

FIG. 2 is a perspective view of the lens assembly shown in FIG. 1 viewed from one side, FIG. 3 is a perspective view of the lens assembly shown in FIG. 1 viewed from the other side, and FIG. 4 is a cross-sectional view taken along line I-I' shown in FIG. 2.

The liquid lens 110, the first device 120 and the second device 140 shown in FIGS. 2 to 4 described below are only an example for helping the understanding the liquid lens 110, the first device 120 and the second device 140 shown in FIG. 1. That is, the liquid lens 110, the first device 120, and the second device 140 shown in FIG. 1 may have various shapes different from those shown in FIGS. 2 and 3. That is, the liquid lens 110 in the embodiment includes at least eight individual electrodes, and at least one of the first device 120 and the second device 140 has a structure disposed between the eight individual electrodes.

The liquid lens 110 shown in FIGS. 2 and 4 includes a plurality of different types of liquids LQ1 and LQ2, first to third plates P1, P2, P3, first and second electrodes E1, E2 and an insulating layer 116.

The liquid lens 110 may include a cavity (CA). The plurality of liquids LQ1 and LQ2 are received in the cavity CA, and may include a conductive first liquid LQ1 and a non-conductive second liquid (or insulating liquid) LQ2. The first liquid LQ1 and the second liquid LQ2 do not mix with each other, and an interface BO may be formed at a portion in contact between the first and second liquids LQ1 and LQ2. For example, the second liquid LQ2 may be disposed on the first liquid LQ1, but the embodiment is not limited thereto. That is, the second liquid LQ2 may be disposed on the first liquid LQ1, and conversely, the first liquid LQ1 may be disposed on the second liquid LQ2.

In addition, in the cross-sectional shape of the liquid lens 110, an edge portion may be thinner than a center portion.

The first liquid LQ1 may be a conductive material, and the second liquid LQ2 may be an insulating material.

The inner surface of the first plate P1 may form a sidewall i of the cavity CA. The first plate P1 may include upper and lower openings having preset inclined surfaces. That is, the cavity CA may be a through-hole region inside the first plate P1.

As illustrated in FIG. 4, an area of the first opening in the direction in which light is incident from the cavity CA may be smaller than an area of the second opening in the opposite direction. Alternatively, the liquid lens 110 may be disposed so that the inclination direction of the cavity CA is opposite. That is, unlike shown in FIG. 4, the area of the second opening in the direction in which the light is incident from the cavity CA may be larger than the area of the first opening in the opposite direction. In addition, when the liquid lens 110 is disposed so that the inclination direction of the cavity CA is opposite, all or part of the arrangement of the components included in the liquid lens 110 is changed together according to the inclination direction of the liquid lens 110. Alternatively, only the inclination direction of the cavity CA may be changed and the arrangement of the remaining components may not be changed.

A diameter of the wider opening among the first and second openings may vary depending on a field of view (FOV) required by the liquid lens 110 or a role that the liquid lens 110 performs in the camera module 1000. According to an embodiment, a size (or area, or width) 02 of the second opening may be larger than a size (or area, or width) 01 of the first opening. Here, a size of each of the first and second openings may be a cross-sectional area in a horizontal direction (eg, an x-axis and a y-axis direction). For example, the size of each of the first and second openings may mean a radius when the cross-section of the opening is circular, and may mean a length of a diagonal when the cross-section of the opening is square.

Each of the first and second openings may have the shape of a hole having a circular cross-section, and the interface BO formed by the two liquids may move along the inclined surface of the cavity CA by a driving voltage.

The first liquid LQ1 and the second liquid LQ2 are filled, received, or disposed in the cavity CA of the first plate P1. Also, the cavity CA is a portion through which light incident to the liquid lens 110 passes. Accordingly, the first plate P1 may be made of a transparent material or may include impurities for blocking light transmission.

The plurality of first electrodes E1 may be disposed spaced apart from the second electrode E2 and disposed on a first surface SF1 (ie, an upper surface), a lateral surface, and a lower surface of the first plate P1, respectively. The second electrode E2 may be disposed on at least a partial region of a second surface SF2 (ie, the lower surface) of the first plate P1 and may directly contact the first liquid LQ1.

Referring to FIG. 4, when an upper area and a lower area of the first plate P1 are the same before the first and second openings are formed, the first opening has a smaller area than the second opening as described above. Therefore, in the first plate P1, an area of the first surface SF1 around the first opening is larger than an area of the second surface SF2 around the second opening.

Also, the first electrode E1 may be n electrodes (hereinafter, referred to as 'individual electrodes'), and the second electrode E2 may be one electrode (hereinafter, referred to as 'common electrode'). Here, n is a positive integer of 2 or more. Here, n may be 8. That is, the first electrode E1 may be divided into eight individual electrode sectors. In this case, an area of each of the eight individual electrode sectors may be equal to each other.

A part of the second electrode E2 disposed on the second surface SF2 of the first plate P1 may be exposed to the first liquid LQ1 having conductivity.

Each of the first and second electrodes E1 and E2 may be made of a conductive material, for example, a metal.

Also, the second plate P2 may be disposed on one surface of the first electrode E1. That is, the second plate P2 may be disposed on the first surface SF1 of the first plate P1. Specifically, the second plate P2 may be disposed on the upper surface of the first electrode E1 and the cavity CA.

The third plate P3 may be disposed on one surface of the second electrode E2. That is, the third plate P3 may be disposed on the second surface SF2 of the first plate P1. Specifically, the third plate P3 may be disposed below the lower surface of the second electrode E2 and the cavity CA.

The second plate P2 and the third plate P3 may be disposed to face each other with the first plate P1 interposed therebetween. Also, at least one of the second plate P2 and the third plate P3 may be omitted.

At least one of the second or third plates P2 and P3 may have a rectangular planar shape. The third plate P3 may contact and adhere to the first plate P1 in a bonding area around an edge portion.

Each of the second and third plates P2 and P3 is a region through which light passes, and may be formed of a light-transmitting material. For example, each of the second and third plates P2 and P3 may be made of glass, and may be made of the same material for convenience of the process.

The second plate P2 may have a configuration that allows light incident on the liquid lens 110 to travel into the cavity CA of the first plate P1.

The third plate P3 may have a configuration that allows light passing through the cavity CA of the first plate P1 to be emitted from the liquid lens 110. The third plate P3 may be in direct contact with the first liquid LQ1.

According to an embodiment, the third plate P3 may have a larger diameter than a diameter of a wider opening among the first and second openings of the first plate P1. In addition, the third plate P3 may include a peripheral region spaced apart from the first plate P1.

The insulating layer 116 may be disposed while covering a part of the lower surface of the second plate P2 in the upper region of the cavity CA. That is, the insulating layer 116 may be disposed between the second liquid LQ2 and the second plate P2.

Also, the insulating layer 116 may be disposed while covering a part of the first electrode E1 forming the sidewall of the cavity CA. In addition, the insulating layer 116 may be disposed on the lower surface of the first plate P1 to cover a part of the first electrode E1, the first plate P1, and the second electrode E2. Accordingly, contact between the first electrode E1 and the first liquid LQ1 and contact between the first electrode E1 and the second liquid LQ2 may be blocked by the insulating layer 116. The insulating layer 116 covers one of the first and second electrodes E1 and E2 (eg, the first electrode E1) and the other electrode (eg, the second electrode E2) may be exposed so that electrical energy is applied to the first liquid LQ1 having conductivity.

Figure 5:
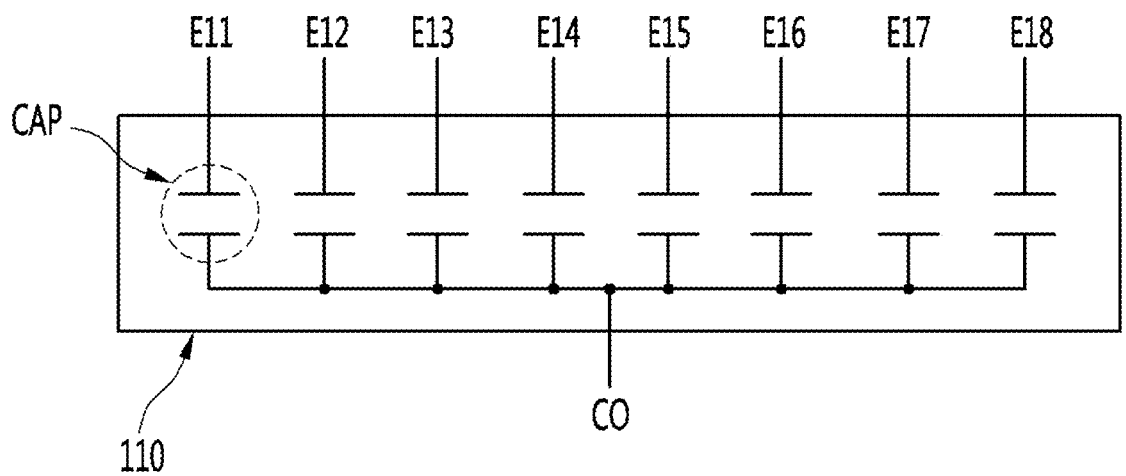
FIG. 5 shows an equivalent circuit of the liquid lens shown in FIG. 4.

FIG. 5 shows an equivalent circuit of the liquid lens shown in FIG. 4.

Referring to FIGS. 2 and 5, the operation of the liquid lens 110 is as follows.

The liquid lens 110 in which a shape of the interface BO is adjusted in response to a driving voltage may receive the driving voltage through a plurality of first electrodes E1:E11, E12, E13, E14, E15, E16, E17, and E18 and the second electrode E2: CO-C1, C2, C3, C4 arranged in eight different directions while having the same angular distance.

When a driving voltage is applied through any one of the plurality of first electrodes E1:E11, E12, E13, E14, E15, E16, E17, and E18 and the second electrode E2:CO, the shape of the interface BO between the first liquid LQ1 and the second liquid LQ2 may be deformed. The degree and shape of the deformation of the interface BO between the first liquid LQ1 and the second liquid LQ2 may be controlled by the controller 200 to implement at least one of the AF function and the OIS function. That is, the controller 200 may generate a driving voltage for controlling the liquid lens 110. To this end, the controller 200 may include a driving voltage generating circuit (not shown) for applying the driving voltage to each of the plurality of first electrodes E1:E11, E12, E13, E14, E15, E16, E17, E18 and the second electrodes E2:CO. That is, the first electrode E1 may be an individual electrode, and the second electrode E2 may be a common electrode.

And, the individual electrodes may include a first individual electrode E11, a second individual electrode E12, a third individual electrode E13, a fourth individual electrode E14, a fifth individual electrode E15, a sixth individual electrode E16, a seventh individual electrode E17 and an eighth individual electrode E18.

In addition, referring to FIG. 5, the liquid lens 110 may be described as a capacitor CAP to which one side of the liquid lens 110 receives voltage from the second electrodes E2:C0, and the other side of the liquid lens 110 receives the second electrode E2:C0.

Meanwhile, in order to explain the concept of the camera module 1000 according to the embodiment, in FIG. 1, the first device 120 is exemplified as being spaced apart from the liquid lens 110. However, the first device 120 may be disposed on the liquid lens 110, and more specifically, it may be disposed on one surface of the first plate P1 together with the plurality of first electrodes E1: E11, E12, E13, E14, E15, E16, E17, and E18.

That is, according to the embodiment, the first device 120 may dispose spaced apart from the plurality of first electrodes E1:E11, E12, E13, E14, E15, E16, E17, E18 that are individual electrodes as shown in FIG. 5, and the first device 120 may dispose on the first surface SF1 of the first plate P1 on which a plurality of first electrodes E1:E11, E12, E13, E14, E15, E16, E17, E18 as shown in FIG. 4, which are individual electrodes, are disposed.

Also, in FIG. 1, the second device 140 is illustrated as being spaced apart from the liquid lens 110. However, the second device 140 may be disposed on the liquid lens 110. That is, according to the embodiment, the second device 140 shown in FIG. 1 may be disposed spaced apart from the plurality of first electrodes E1:E11, E12, E13, E14, E15, E16, E17, E18 that are individual electrodes as shown in FIG. 5, and the second device 140 may dispose on the first surface SF1 of the first plate P1 on which a plurality of first electrodes E1:E11, E12, E13, E14, E15, E16, E17, E18 as shown in FIG. 4, which are individual electrodes, are disposed, or the second device 140 may be disposed on the first surface SF1, which is a wider surface among the first surface SF1 and the second surface SF2 of the first plate P1.

According to an embodiment, the first device 120 and the second device 140 may be disposed together on the same surface of the first plate P1, that is, on the first surface SF1 while being spaced apart from each other. More specifically, the first device 120 and the second device 140 may be spaced apart from each other and disposed on the same surface of the first plate P1, ie, on the first surface SF1, together with the plurality of first electrodes E1: E11, E12, E13, E14, E15, E16, E17, E18.

FIGS. 6 to 9 are views for explaining various planar shapes of the first electrode, the first device, and the second device according to the embodiment. For ease of understanding, the second plate P2 illustrated in FIG. 4 is omitted in FIGS. 6 to 9.

According to an embodiment, as shown in FIGS. 6 to 9, the first device 120 and the second device 140 may be disposed on the first plate P1 in a predetermined pattern shape. For example, the first device 120 and the second device 140 may have a planar shape including a triangular protrusion protruding in one direction. However, this is only one embodiment of the first device 120 and the second device 140, and may have a pattern having a different shape.

For example, the first device 120 and the second device 140 may have a planar shape of a bracket bent in one direction. Alternatively, the first device 120 and the second device 140 may have a serpentine planar shape. Alternatively, the first device 120 and the second device 140 may have a spring plane shape. FIGS. 6 to 9 are exemplary planar shapes of the first device 120 and the second device 140, and embodiments are not limited thereto and may have various planar shapes.

Figure 6:
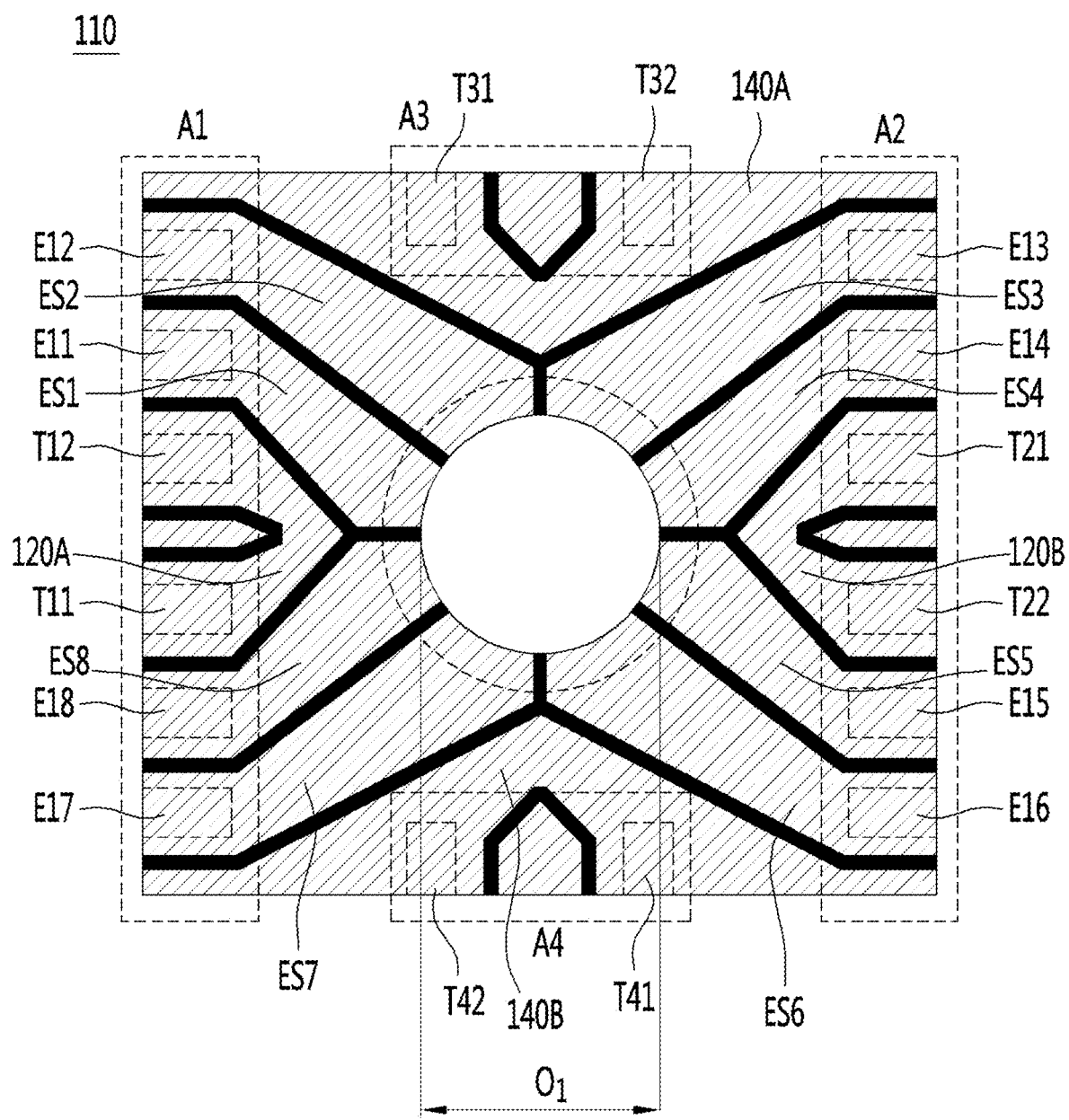
FIGS. 6 to 9 are views for explaining various planar shapes of the first electrode, the first device, and the second device according to the embodiment.

As shown in FIG. 6, the first device 120 may be configured in plurality. For example, the first device 120 may include a first-first device 120A and a first-second device 120B. In addition, the first-first device 120A and the first-second device 120B may be disposed to face each other with a center of the liquid lens 110 interposed therebetween.

Also, the second device 140 may be configured in plurality. For example, the second device 140 may include a second-first device 140A and a second-second device 140B. In addition, the second-first device 140A and the second-second device 1*b*0B may be disposed to face each other with the center of the liquid lens 110 interposed therebetween.

For example, the first-first device 120A and the first-second device 120B may be respectively disposed in a left region and a right region with the center of the liquid lens 110 interposed therebetween. In addition, the second-first device 140A and the second-second device 140B may be respectively disposed in an upper region and a lower region with the center of the liquid lens 110 interposed therebetween.

That is, in the liquid lens 110, the first surface SF1 of the first plate P1 may include first to fourth regions A1, A2, A3, and A4. The first region A1 may be an area facing the second region A2 with the center of the liquid lens 110 interposed therebetween. That is, the second region A2 may be a region opposite to the first region A1. The third region A3 may be an area facing the fourth region A4 with the center of the liquid lens 110 interposed therebetween. That is, the fourth region A4 may be a region opposite to the third region A3.

The first-first device 120A may be dispose in the first region A1 of the first surface SF1, and the first-second device 120B may be disposed in the second region A2 of the first surface SF1. In addition, the second-first device 140A may be disposed in the third region A3 of the first surface SF1, and the second-second device 140B may be disposed in the fourth region A4 of the first surface SF1. However, this is only an embodiment, and the region in which the first device 120 and the second device 140 are disposed may be variously changed.

For example, the first-first device 120A and the first-second device 120B may be disposed in the first region A1 and the third region A3 of the first surface SF1, and the second-first device 140A and the second-second device 140B may be respectively disposed in the second region A2 and the fourth region A4 of the first surface SF1. However, in order to secure the reliability of the temperature detection operation in the entire area of the liquid lens 110 and the reliability of the heating operation, the first-first device 120A and the first-second device 120B are disposed in regions facing each other, and similarly, the second-first device 140A and the second-second device 140B are disposed in regions facing each other In addition, the first-first device 120A and the first-second device 120B may be disposed to face each other in a diagonal direction with respect to the center of the liquid lens 110. Similarly, the second-first device 140A and the second-second device 140B may be disposed to face each other in a diagonal direction with respect to the center of the liquid lens 110.

Meanwhile, the first device 120 may function as a temperature sensing device for sensing the temperature of the liquid lens 110, and the second device 140 functions as a heating device for heating the liquid lens 110. That is, the first device 120 may be a temperature sensor for sensing the temperature of the liquid lens 110, and the second device 140 may be a heater for heating the liquid lens 110.

As described above, as the first device 120 is configured in plurality, the temperature of the entire region of the liquid lens 110 may be more accurately detected. In addition, as the second device 140 is configured in plurality, the entire region of the liquid lens 110 may be uniformly heated more quickly.

Figure 7:
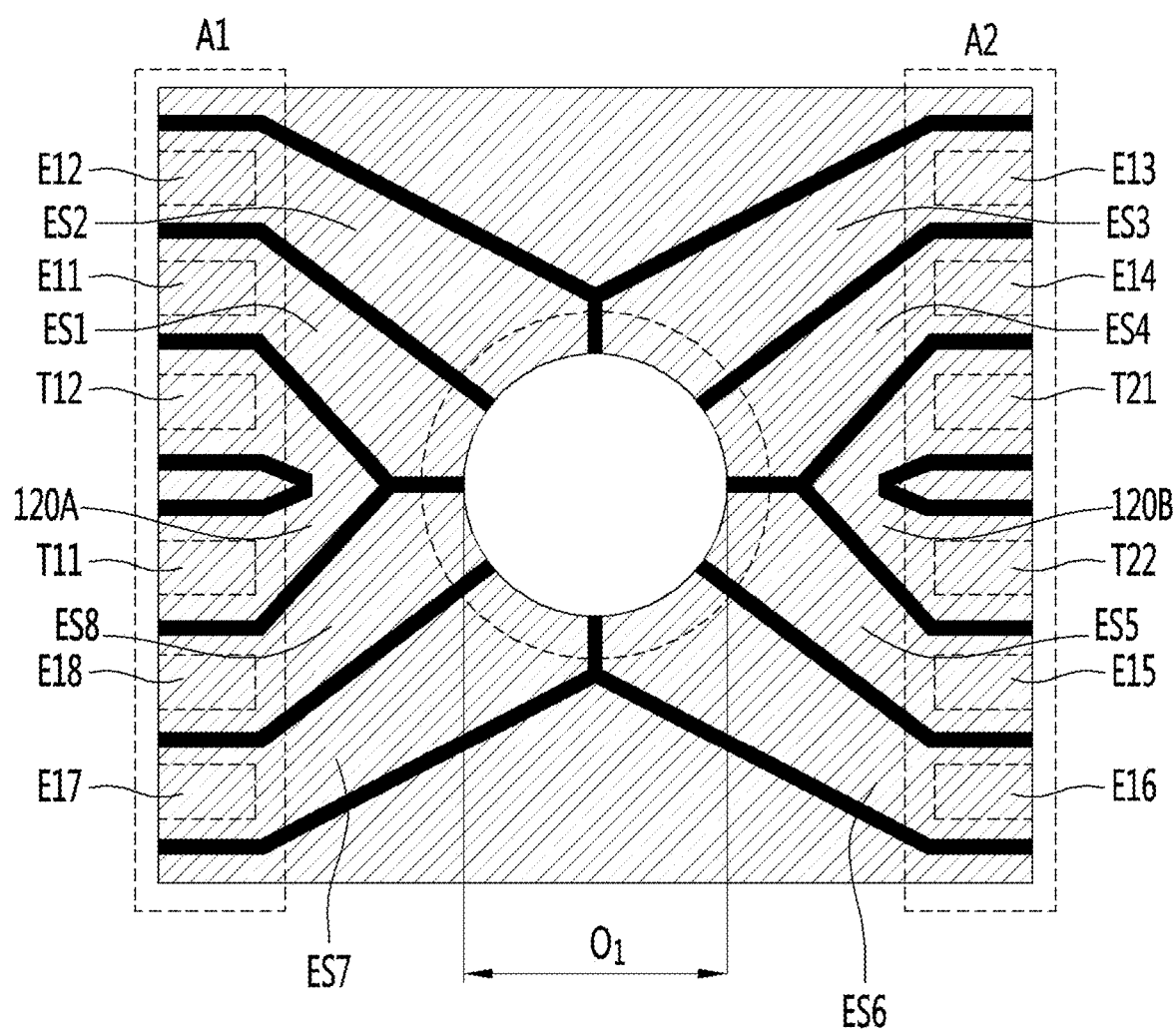

Meanwhile, as shown in FIG. 7, the liquid lens 110 may include only the first device 120. In this case, when the liquid lens 110 includes only the first device 120, the first device 120 may be disposed in the first region A1 and the second region A2 as shown in FIG. 7, but is not limited thereto. For example, the first device 120 may be disposed in all of the first to fourth regions A1 to A4. That is, the first device 120 may be disposed in at least one of the first to fourth regions A1 to A4.

Figure 8:
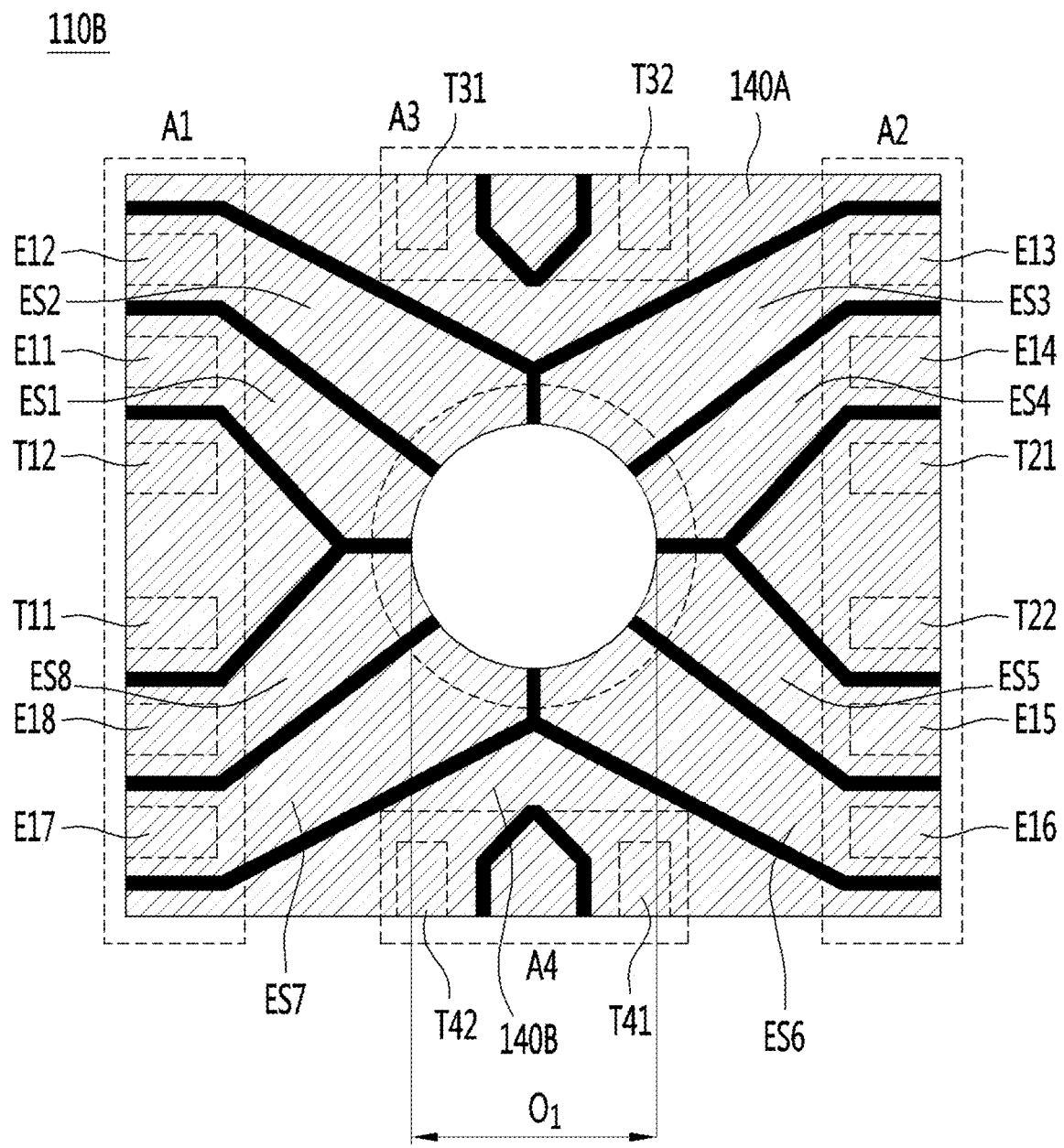

Alternatively, as shown in FIG. 8, the liquid lens 110 may include only the second device 140. In this case, when the liquid lens 110 includes only the second device 140, the second device 140 may be disposed in the third region A3 and the fourth region A4 as shown in FIG. 8, but is not limited thereto. For example, the second device 140 may be disposed in all of the first to fourth regions A1 to A4. That is, the second device 140 may be disposed in at least one of the first to fourth regions A1 to A4.

Also, the first device 120 may be disposed in the first region A1, the second region A2, and the third region A3, and the second device 140 may be only disposed in the fourth region A4. Alternatively, the second device 140 may be disposed in the first region A1, the second region A2, and the third region A3, and the first device 120 may be only disposed in the fourth region A4. That is, any one of the first device 120 and the second device 140 may be disposed in three regions among the first to fourth regions, and the other device may be disposed in the other one region. In addition, any one of the first device 120 and the second device 140 may be disposed in two of the first to fourth regions, and the other device may be disposed in two of the remaining two regions.

In conclusion, a number of first devices 120, a number of second devices 140, an arrangement position of the first device 120, and an arrangement position of the second device 140 may be variously changed an embodiment.

As shown in FIG. 4, the first device 120 and the second device 140 may be disposed between the first surface SF1 of the first plate P1 and the second plate P2. However, the first device 120 and the second device 140 are not illustrated in FIG. 2 because they are covered by the second plate P2.

Also, referring to FIG. 4, the first device 120 and the second device 140 may be respectively disposed on the first plate P1. Although it will be described later with reference to FIG. 14, a current flows to the first device 120 to sense the temperature of the liquid lens 110, and a current flows to the second device 140 to heat the liquid lens 110. when the first device 120 and the second device 140 are disposed on the first electrode E1 without interposing the insulating layers IS1 and IS2, the first electrode E1, the device 120 and the second device 140 may be short-circuited. To inhibit this, insulating layers IS1 and IS2 are disposed between the first electrode E1 and each of the first device 120 and the second device 140, and these (E1, 120, 140) are electrically separated from each other. Through this, it is possible to inhibit these (E1, 120, 140) from being short-circuited. The insulating layers IS1 and IS2 may include an air layer or a glass layer generated by fusing the first plate and the second plate or other insulating member, and the insulating layers IS1 and IS2 may be implemented with the same material as the insulating layer 116 shown in FIG. 4.

Meanwhile, the first device 120 may be made of a material whose characteristics (eg, resistance value) change according to temperature. For example, the first device 120 may be implemented as a resistor or a thermistor. A thermistor is a heat-sensitive semiconductor that has a resistance value that changes with temperature.

The second device 140 may be implemented as a resistor that generates heat when current flows or may be implemented as a conductor having a resistance component, but the embodiment is not limited to a specific type of the second device 140. That is, any element that generates heat when a current is flowed or a voltage is applied can be a heating device.

Meanwhile, the plurality of first electrodes E1:E11, E12, E13, E14, E15, E16, E17, and E18 may be divided and disposed into eight sectors. For example, the plurality of first electrodes E1: E11, E12, E13, E14, E15, E16, E17, and E18 may include a first electrode sector ES1, a second electrode sector ES2, a third electrode sector ES3, a fourth electrode sector ES4, a fifth electrode sector ES5, a sixth electrode sector ES6, a seventh electrode sector ES7, and an eighth electrode sector ES8.

Each of the first electrode sector ES1, the second electrode sector ES2, the third electrode sector ES3, the fourth electrode sector ES4, the fifth electrode sector ES5, the sixth electrode sector ES6, the seventh electrode sector ES7 and the eighth electrode sector ES8 may be disposed to extend to the second surface SF2 of the first plate P1 along the first surface SF1 of the first plate P1 and the sidewall i of the cavity CA.

The first electrode sector ES1, the second electrode sector ES2, the seventh electrode sector ES7, and the eighth electrode sector ES8 may be disposed in the first region A1 of the first surface SF1 of the first plate P1. In addition, the third electrode sector ES3, the fourth electrode sector ES4, the fifth electrode sector ES5, and the sixth electrode sector ES6 may be disposed in the second region A2 of the first surface SF1 of the first plate P1. That is, the first electrode sector ES1, the second electrode sector ES2, the seventh electrode sector ES7, and the eighth electrode sector ES8 may be first sectors disposed in the first region A1. Also, the third electrode sector ES3, the fourth electrode sector ES4, the fifth electrode sector ES5, and the sixth electrode sector ES6 may be second sectors disposed in the second region A2. In this case, the first sectors and the second sectors may be disposed to face each other with the center of the liquid lens 110 interposed therebetween. For example, the first sectors and the second sectors may have a symmetrical shape based on an imaginary extension line crossing the center of the liquid lens 110.

The first electrode sector ES1, the second electrode sector ES2, the third electrode sector ES3, the fourth electrode sector ES4, the fifth electrode sector ES5, the sixth electrode sector ES6, the seventh electrode sector ES7 and the eighth electrode sector ES8 may have the same angular distance based on the interface of the liquid lens 110.

In this case, the first electrode sector ES1, the second electrode sector ES2, the third electrode sector ES3, the fourth electrode sector ES4, the fifth electrode sector ES5, the sixth electrode sector ES6, the seventh electrode sector ES7 and the eighth electrode sector ES8 may be divided into two subgroups. For example, the first subgroup may include a first electrode sector ES1, a third electrode sector ES3, a fifth electrode sector ES5, and a seventh electrode sector ES7. In addition, the second sub-group may include a second electrode sector ES2, a fourth electrode sector ES4, a sixth electrode sector ES6, and an eighth electrode sector ES8. In this case, the electrode sectors of the second subgroup may be respectively disposed between the four electrode sectors constituting the first subgroup.

The first electrode sector ES1 and the fifth electrode sector ES5 may be disposed in a mutually symmetrical direction with respect to a center (eg, an optical axis) of the liquid lens 110. Also, the second electrode sector ES2 and the sixth electrode sector ES6 may be disposed in a mutually symmetrical direction with respect to a center (eg, an optical axis) of the liquid lens 110. In addition, the third electrode sector ES3 and the seventh electrode sector ES7 may be disposed in a mutually symmetrical direction with respect to a center (eg, an optical axis) of the liquid lens 110. Also, the fourth electrode sector ES4 and the eighth electrode sector ES8 may be disposed in a mutually symmetrical direction with respect to the center (eg, an optical axis) of the liquid lens 110.

Meanwhile, the first electrode sector ES1 and the eighth electrode sector ES8 may be respectively disposed on both sides of the first-first device 120A with the first-first device 120A interposed therebetween.

In addition, the second electrode sector ES2 and the third electrode sector ES3 may be respectively disposed on both sides of the second-first device 140A with the second-first device 140A interposed therebetween.

In addition, the fourth electrode sector ES3 and the fifth electrode sector ES5 may be disposed on both sides of the first-second device 120B with the first-second device 120B interposed therebetween.

Also, the sixth electrode sector ES6 and the seventh electrode sector ES7 may be respectively disposed on both sides of the second-second device 140B with the second-second device 140B interposed therebetween. As described above, by disposing the electrode sectors on both sides of the first device 120 and the second device 140, respectively, the first to eighth electrode sectors may have the same angular distance based on the interface included in the liquid lens 110 while securing a region in which the first device 120 and the second device 140 are disposed.

Figure 9:
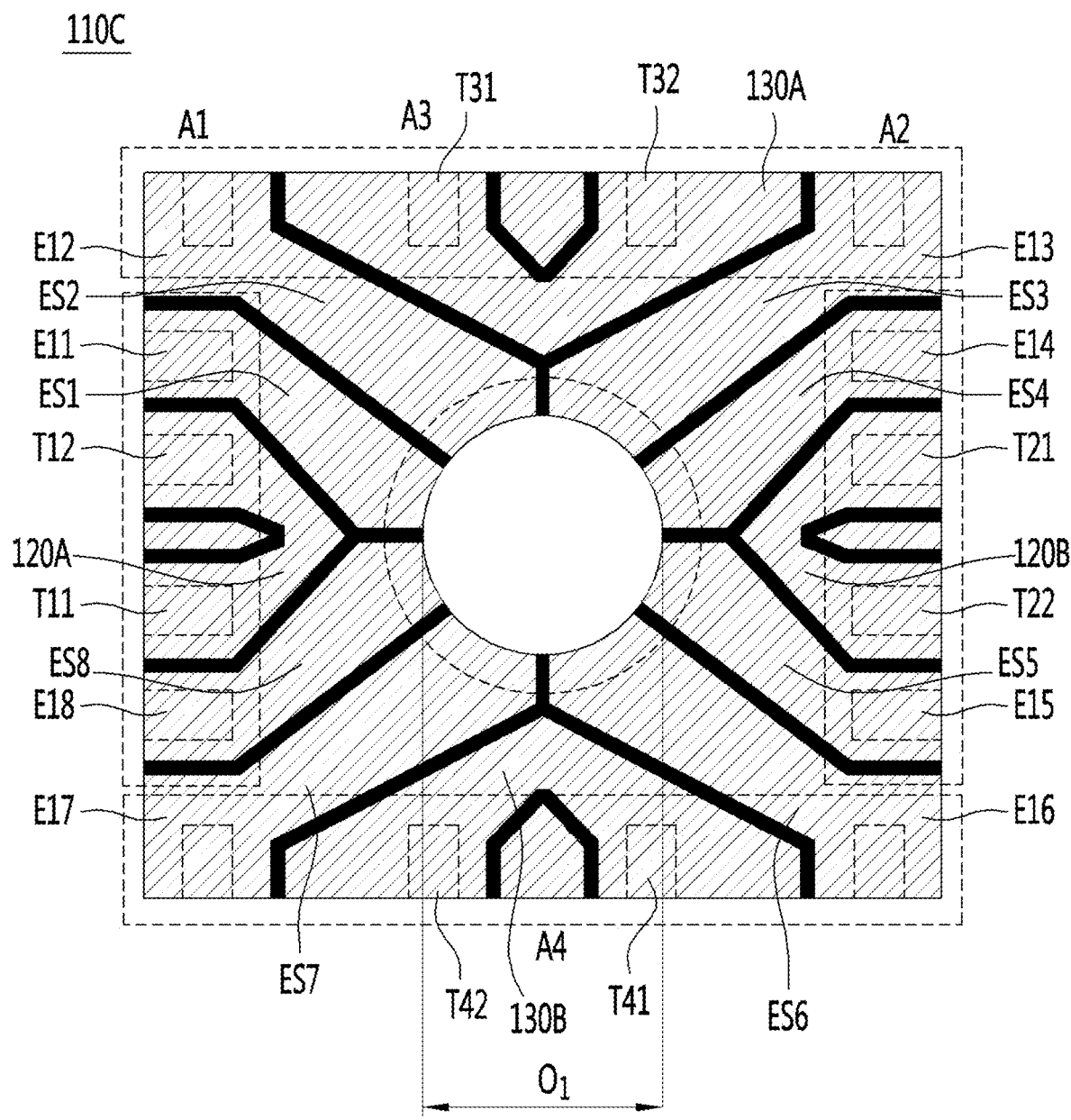

Meanwhile, as shown in FIG. 9, the second electrode sector ES2 and the third electrode sector ES3 may be disposed in the third region A3. Also, the sixth electrode sector ES6 and the seventh electrode sector ES7 may be disposed in the fourth region A4.

Accordingly, two electrode sectors and one device may be disposed in each of the first to fourth regions.

As shown, the liquid lens 110 including the interface formed by two different liquids has the eight first electrodes E1: E11, E12, E13, E14, E15, E16, E17, E18 constituting the individual electrodes and a second electrode E2. In addition, in order to control the interface of the liquid lens 110, the controller 200 may apply a driving voltage to the first electrodes E1: E11, E12, E13, E14, E15, E16, E17, E18 and the second electrode E2. In this case, the control module for controlling the liquid lens 110 may include an Optical Image Stabilizer (OIS) portion 400, a gyro sensor 500, and the like. In addition, the controller 200 may include a driving circuit that generates a driving voltage.

The driving circuit may generate 8 individual driving voltages transmitted to each of the 8 first electrodes. The driving circuit may receive an adjustment variable for determining the levels of the individual driving voltages from the OIS portion 400 or the like to determine the levels of the eight individual driving voltages using a power voltage.

For example, a sum of the driving voltages applied to at least eight individual electrodes generated by the driving circuit is determined by the AF function of the camera module, and the deviation of the individual driving voltages by dividing the driving voltages may be determined by the OIS function of the camera module.

For example, information on the movement of the camera module may be obtained from the gyro sensor 500 included in the camera module. Information on the movement of the camera module is transmitted to the OIS portion 400, and the OIS portion 400 may calculate a value to adjust the lens to compensate for the movement of the camera module. The compensation value calculated by OIS portion 400 is to adjust an inclination ratio and curvature of the interface formed by the two liquids in the liquid lens 110 so that the image on which the optical signal passing through the liquid lens 110 is formed moves in a specific direction. This operation control may be possible because the interface within the liquid lens 110 may change its curvature in response to the voltage level applied to the individual electrodes.

In addition, the driving circuit may determine eight individual driving voltages by reflecting data determined through lens calibration for the liquid lens 110. The liquid lens 110 may have a minute characteristic difference due to a process error in the manufacturing process, and this difference may be dataized through lens calibration, and this may be used to control the lens.

Figure 10:
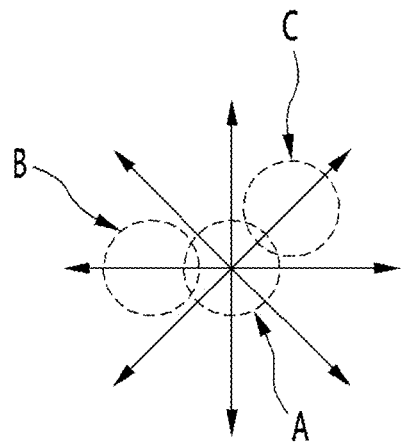
FIG. 10 illustrates an electrode arrangement of the liquid lens and a direction of OIS operation.
Figure 10:
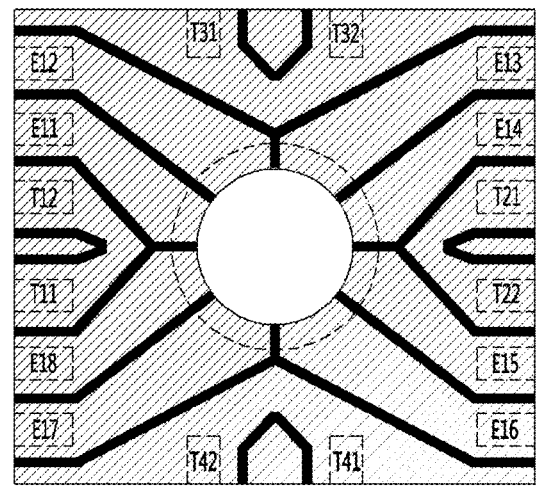

FIG. 10 illustrates an electrode arrangement of the liquid lens and a direction of OIS operation.

As shown, the interface (A) of the liquid lens including the eight first electrodes E1:E11, E12, E13, E14, E15, E16, E17, E18 can be moved left or right by changing a supply voltage. At this time, the interface (A) of the liquid lens is not physically moved to the left or moved to the right to be formed at new positions B and C. That is, this means that, due to a change in the curvature of the interfaces A, B, and C, the positions of the images passing through the interfaces A, B, and C may move.

Figure 11:
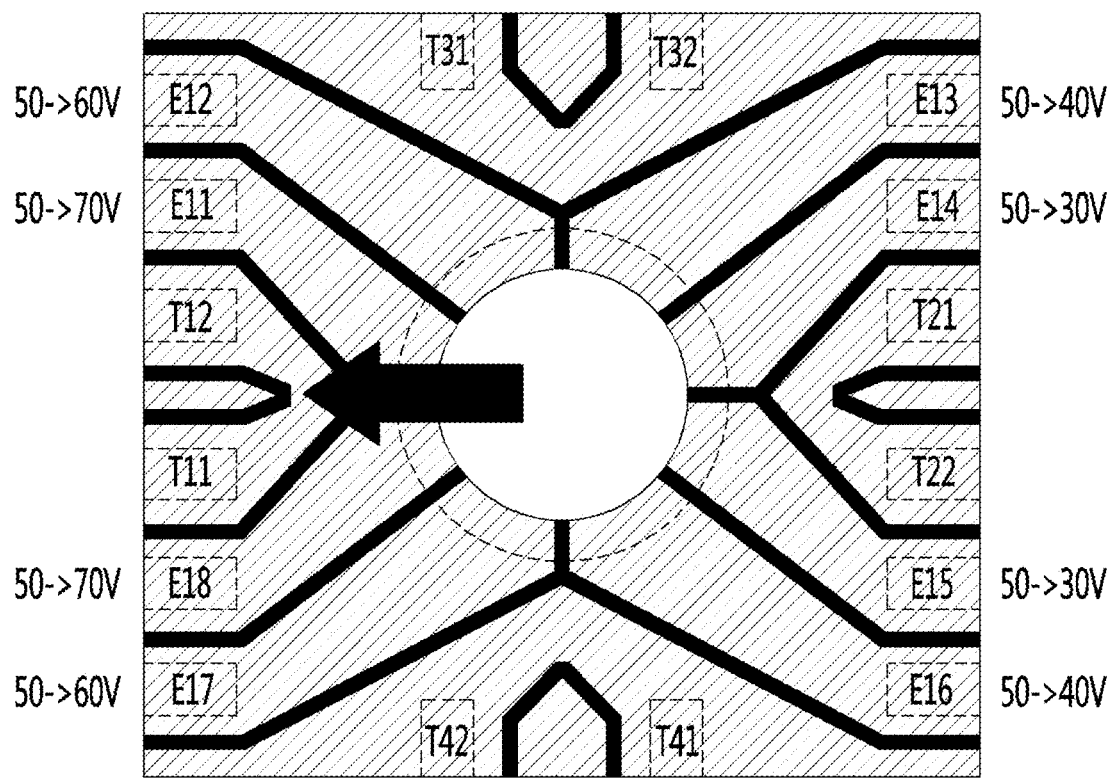
FIGS. 11 and 12 explain an example of an OIS operation.
Figure 12:
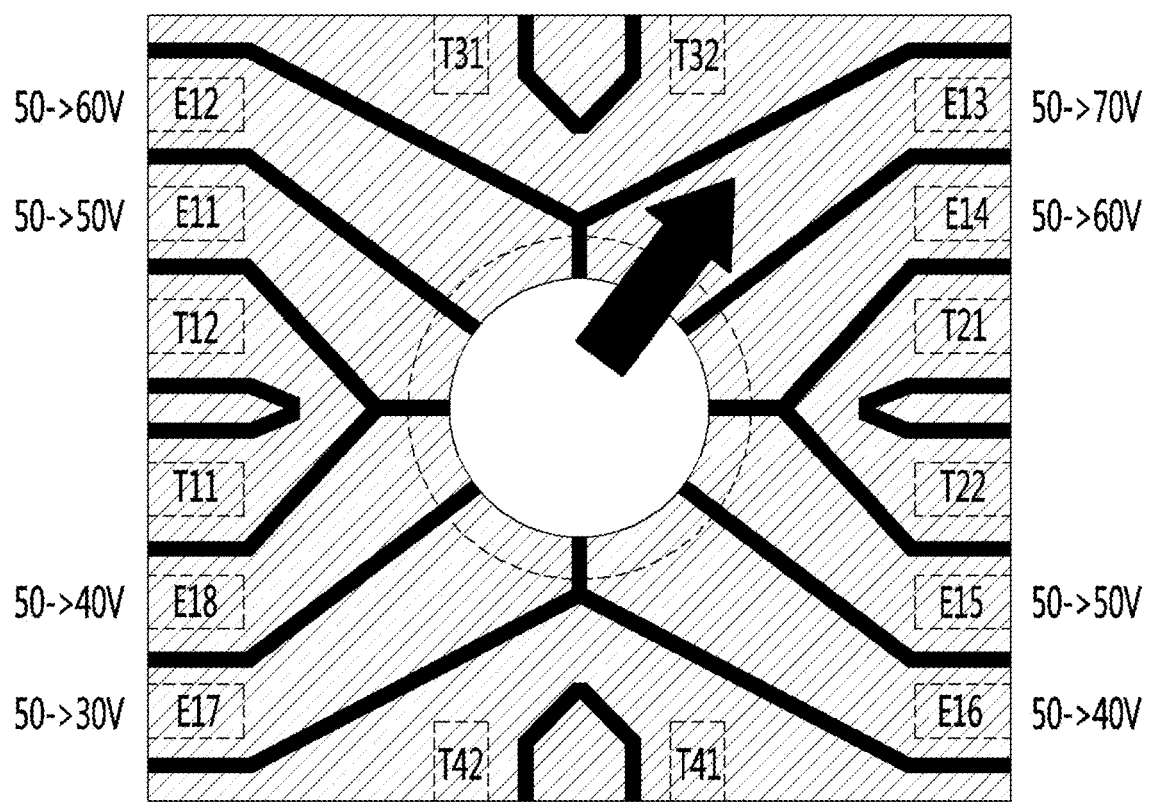

FIGS. 11 and 12 explain an example of an OIS operation. Specifically, FIG. 12 illustrates individual driving voltages applied to the liquid lens 110 to shift the image that has passed through the liquid lens to the left, and FIG. 12 illustrates individual driving voltages applied to the liquid lens 110 to move the image passing through the liquid lens in the upper right diagonal direction.

Referring to FIG. 11, when the same driving voltage of 50V is supplied to all eight first electrodes E1: E11, E12, E13, E14, E15, E16, E17, and E18, the interface A can be located at the center. After that, different levels of individual supply voltages may be applied to the eight first electrodes E1:E11, E12, E13, E14, E15, E16, E17, and E18 for the OIS operation(ie, when the position of the lens needs to be adjusted due to the inclination of the camera module, hand shake, etc., for example, when the image forming position (A) that has passed through the interface moves to the left position (B)). For example, the driving voltage of 50V supplied to the first individual electrode E11 and the eighth individual electrode E18 increases to 70V, the driving voltage of 50V supplied to the second individual electrode E12 and the seventh individual electrode E7 is increased to 60V, the driving voltage of 50V supplied to the third individual electrode E13 and the sixth individual electrode E16 is reduced to 40V, and the driving voltage of 50V supplied to the fourth individual electrode E4 and the fifth individual electrode E5 may be reduced to 30V, to move the left direction.

That is, in order to move the interface in the left direction, the 50V driving voltage supplied to the first individual electrode E11 and the eighth individual electrode E18 may increase to 70V, and the driving voltage of 50V supplied to the fourth individual electrode E4 and the fifth individual electrode E5 positioned opposite to the E11 and E18 with respect to the interface may be reduced to 30V. In this case, the curvature of the interface is changed, and the position where the image passing through the interface (B) is formed may move to the left.

Here, the eight individual driving voltages delivered to the eight first electrodes E1: E11, E12, E13, E14, E15, E16, E17, E18 of the liquid lens 28 may have five different levels and, a largest individual driving voltage and a smallest individual driving voltage may be applied in opposite directions with respect to the interface. Meanwhile, the individual driving voltages of the same magnitude may be symmetrically applied to the individual electrodes positioned on both sides based on the largest individual driving voltage and the smallest individual driving voltage.

Referring to FIG. 12, when it is desired to move the interface A (more precisely, the position where the image passing through the interface A is formed) located at the center of the liquid lens in an oblique direction, individual supply voltages may be applied to the eight first electrodes included in the liquid lens 110.

For example, in order to realize the interface (C, see FIG. 10) moved in the diagonal direction, the individual driving voltage applied to the eight first electrodes E1:E11, E12, E13, E14, E15, E16, E17 and E18 need to be adjusted. For example, the individual driving voltages that can be applied to the first and fifth individual electrodes E11 and E15 are maintained at 50V, but the individual driving voltages that can be applied to the third and seventh individual electrodes E13 and E17 may be adjusted to 70V and 30V. In addition, the individual driving voltages supplied to the sixth and eighth individual electrodes E16 and E18 may decrease from 50V to 40V, and the individual driving voltages supplied to the second and fourth individual electrodes E12 and E14 may increase from 50V to 60V.

As described above, the interface of the liquid lens 110 may be changed depending on how the level of individual driving voltages generated in the driving circuit is changed. Specifically, the eight individual driving voltages applied to the eight first electrodes E1:E11, E12, E13, E14, E15, E16, E17, and E18 may be the same, and may be have different levels such as 2, 3, or 5. In addition, when the individual driving voltages applied to the eight first electrodes E1: E11, E12, E13, E14, E15, E16, E17, and E18 have symmetry around the interface, it will help to stably maintain the curvature of the interface.

On the other hand, according to the embodiment, connection means for connecting the control circuit or the driving circuit and the individual electrodes of the liquid lens may include a circuit or logic for changing the aforementioned individual driving voltages or determining the electrodes to which the individual driving voltages are applied.

On the other hand, referring back to FIG. 1, the controller 200 may be connected to the first device 120 to sense information about the temperature of the liquid lens 110 and output information about the sensed temperature through an output terminal. To this end, the controller 200 may include a temperature sensing portion 210, but the embodiment is not limited to a specific configuration of the controller 200 including the temperature sensing portion 210.

Also, the controller 200 may be connected to the second device 140 to control whether the second device 140 is driven. Also, the controller 200 may control the intensity of heat generated by the second device 140. To this end, the controller 200 may include a heater controller 220, but is not limited thereto.

As described above, the controller 200 capable of performing the functions of the temperature sensing portion 210 and the heater controller 220 may serve to supply a driving voltage (or operating voltage) to the liquid lens 110. The controller 200 and the image sensor 300 may be mounted on one main board, for example, a printed circuit board (PCB), but this is only an example and the embodiments are not limited thereto. That is, the temperature sensing portion 210 and the heater controller 220 may be disposed on the main board. The controller 200 may correspond to the main board 480 illustrated in FIG. 19 to be described later.

The image sensor 300 may perform a function of converting light passing through the liquid lens 110 of the lens assembly 100 into image data. More specifically, the image sensor 300 may generate image data by converting light into an analog signal through a pixel array including a plurality of pixels, and synthesizing a digital signal corresponding to the analog signal.

When the camera module 1000 according to the embodiment is applied to an optical device or an optical Instrument, the configuration of the control circuit 200 may be designed differently according to specifications required by the optical device. In particular, the controller 200 may be implemented as a single chip to reduce the intensity of the driving voltage applied to the lens assembly 100. Accordingly, the size of the optical device mounted on the portable device may be further reduced.

The liquid lens 110, the first device 120, and the second device 140 shown in the above drawings may be modularized. Hereinafter, the modularized liquid lens 110 is referred to as a 'liquid lens module', and the liquid lens module 130 will be described with reference to FIG. 13 as follows.

Figure 13:
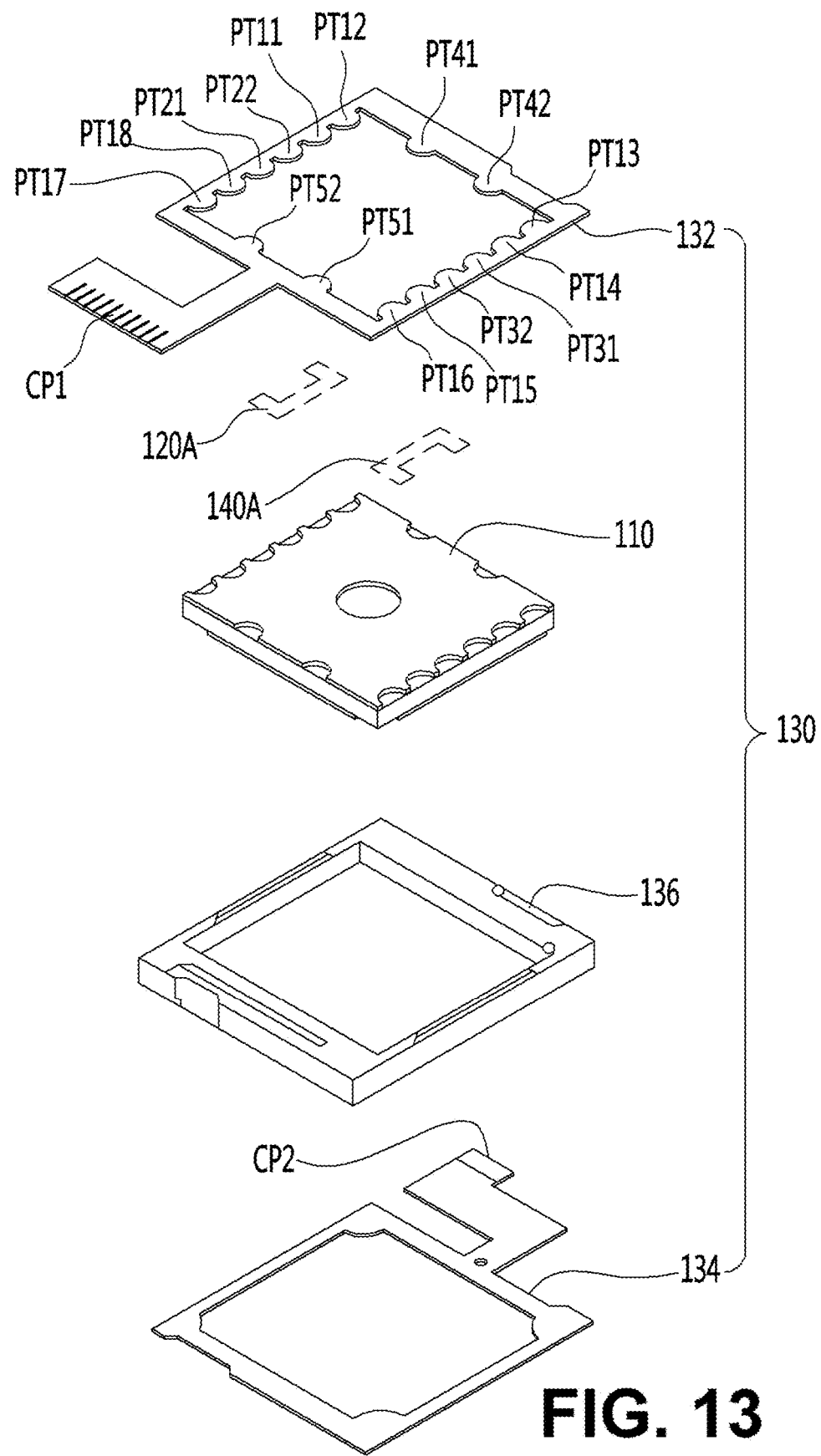
FIG. 13 is a perspective view of a liquid lens module according to an embodiment.

FIG. 13 is a perspective view of a liquid lens module according to an embodiment.

In FIG. 13, the first device 120 and the second device 140 are disposed in the liquid lens 110, but the first connecting substrate 132 and the first device 120 and the second device 140 are shown on the outside of the liquid lens 110 in order to help the understanding of the connection relationship.

FIG. 13 is a plan view of the first connecting substrate 132 and the second connecting substrate 134 before being bent in the −z axis direction.

The liquid lens module 130 may include a first connecting substrate 132, a liquid lens 110, a first device 120, a second connecting substrate 134, and a second device 140. The liquid lens module 130 may include at least one of the first device 120 and the second device 140, and either one may be omitted. The liquid lens 110, the first device 120, and the second device 140 according to the embodiment are not limited to the specific shape of the liquid lens module 130 to be described below.

Also, the shapes, positions, and numbers of the first devices 120A and 120B and the second devices 140A and 140B illustrated in FIG. 13 may be variously changed.

Each of the liquid lens 110, the first devices 120A, 120B, and the second devices 140A, 140B shown in FIG. 13 corresponds to each of the liquid lens 110, the first devices 120A, 120B, and the second devices 140A, 140B shown in FIGS. 2, 4, and 6, the same reference numerals are used, and overlapping descriptions will be omitted.

The first connecting substrate 132 electrically connects the plurality of first electrodes E1: E11, E12, E13, E14, E15, E16, E17, E18 included in the liquid lens 110 to the main board including the controller 200 and disposed on the liquid lens 110. In addition, the first connecting substrate 132 may electrically connect the first device 120A and 120B to the main board, and electrically connect the second device 140A and 140B to the main board.

The first connecting substrate 132 and the first devices 120A and 120B may be electrically connected to each other in various forms, and the first connecting substrate 132 and the second devices 140A and 140B may be electrically connected to each other in various forms. An example will be described as follows with reference to FIGS. 2, 4, and 6 to 13, but the embodiment is not limited thereto.

In FIG. 4, in order to allow the first electrodes E1 (eg, E13 and E17) to be electrically connected to the first connecting substrate 132, as the second plate P2 exposes a part of the first electrode E1, the second plate P2 may expose electrodes (T11, T12, T21, and T22 in FIG. 6) corresponding to the ends of the first devices 120A and 120B and electrodes (T31, T32, T41, and T42 in FIG. 6) corresponding to the ends of the second devices 140A and 140B.

For example, when the first device 120 and the second device 140 shown in FIG. 1 are implemented as shown in FIG. 6, the second plate P2 of the liquid lens 110 shown in FIG. 2. may have first to sixteenth grooves H1 to H16. Here, the first to eighth grooves H1 to H8 may be formed to expose the plurality of first electrodes E1: E11, E12, E13, E14, E15, E16, E17, and E18, and the ninth to eighth grooves H9 to H16 may be formed to expose end portions of the first devices 120A and 120B and the second devices 140A and 140B.

In addition, the third plate P3 may have seventeenth to twentieth grooves H17 to H₂O for exposing the second electrode CO at the corners thereof.

Referring to FIGS. 2 and 6, the ninth groove H9 exposes one end T11 of the first-first device 120A, the tenth groove H10 expose the other end of the first-first device 120A, the eleventh groove H11 exposes one end T31 of the second-first device 140A, the twelfth groove H12 exposes the other end of the second-first device 140A, the thirteenth groove H13 exposes one end T21 of the first-second device 120B, the fourteenth groove H14 exposes the other end of the first-second device 120B, the fifteenth groove H15 exposes one end T41 of the second-second device 140B, and the sixteenth groove H16 exposes the other end of the second-second device 140B.

Referring back to FIG. 13, the first connecting substrate 132 includes first protrusions P11 to P18 protruding toward the liquid lens 110 from an inside to electrically connected to eight first electrodes E1: E11, E12, E13, E14, E15, E16, E17, and E18 to each other. Among the first protrusions, the first-first protrusion P11 may be electrically or physically connected to the first individual electrode E11, the first-second protrusion P12 may be electrically or physically connected to the second individual electrode E12, the first-third protrusion P13 may be electrically or physically connected to the third individual electrode E13, the first-fourth protrusion P14 may be electrically or physically connected to the fourth individual electrode E14, The first-fifth protrusion P15 may be electrically or physically connected to the fifth individual electrode E15, the first-sixth protrusion P16 may be electrically or physically connected to the sixth individual electrode E16, the first-seventh protrusion P17 may be electrically or physically connected to the seventh individual electrode E17, and the first-eighth protrusion P18 may be electrically or physically connected to the eighth individual electrode E18.

In addition, the first connecting substrate 132 may include the second protrusions P21, P22, P31, P32, P41, P42, P51, and P52 protruding toward the liquid lens 110 from an inner edge surface of a region between the first protrusions.

Among the second protrusions, the second-first protrusion P21 is electrically or physically connected to one end T11 of the first-first device 120A exposed through the ninth groove H9. The second-second protrusion P22 is electrically or physically connected to the other end of the first-first device 120A exposed through the tenth groove H10. The second-third protrusion P31 is electrically or physically connected to one end T31 of the second-first device 140A exposed through the eleventh groove H11. The second-fourth protrusion P32 is electrically or physically connected to the other end of the second-first device 140A exposed through the twelfth groove H12. The second-fifth protrusion P41 is electrically or physically connected to the end T21 of the first-second device 120B exposed through the thirteenth groove H13. The second-sixth protrusion P42 is electrically or physically connected to the other end of the first-second device 120B exposed through the fourteenth groove H14. The second-seventh protrusion P51 is electrically or physically connected to one end T41 of the second-second device 140B exposed through the fifteenth groove H15. The second-eighth protrusion P52 is electrically or physically connected to the other end T42 of the second-second device 140B exposed through the sixteenth groove H16.

Referring to FIG. 13, the first connecting substrate 132 may include a connection pad CP1 electrically connected to each of the eight first protrusions PT11 to P18 and each of the eight second protrusions P21, P22, P31, P32, P41, P42, P51, and P52. The connection pad CP1 of the first connecting substrate 132 may be electrically connected to an electrode pad (not shown) formed on the main substrate (eg, 480 illustrated in FIG. 19) of the controller 200. To this end, after the first connecting substrate 132 is bent in the −z-axis direction toward the main substrate, the connection pad CP1 and the electrode pad may be electrically connected to each other using conductive epoxy.

In addition, the first connecting substrate 132 may be implemented as a flexible printed circuit board (FPCB).

The second connecting substrate 134 electrically connects the second electrode E2 included in the liquid lens 110 to the main substrate (eg, 480 shown in FIG. 19), and may be disposed under the liquid lens 110. The second connecting substrate 134 may be implemented as an FPCB or a single metal substrate (conductive metal plate).

The second connecting substrate 134 may be electrically connected to the electrode pad formed on the main substrate through the connection pad CP2 electrically connected to the second electrode E2. To this end, the second connecting substrate 134 may be bent in the −z axis direction toward the main substrate 200.

The liquid lens module 130 according to the embodiment may further include a spacer 136.

The spacer 136 is disposed to surround the lateral surface of the liquid lens 110 between the first connecting substrate 132 and the second connecting substrate 134 in a ring shape to protect the liquid lens 110 from external impact. To this end, the spacer 136 may have a shape in which the liquid lens 110 can be mounted, seated, contacted, fixed, temporarily fixed, supported, coupled, or disposed therein.

Hereinafter, an example of sensing the temperature of the liquid lens 110 using the first devices 120A and 120B in the temperature sensing portion 210 and heating the liquid lens 110 by using the second devices 140A and 140B in the heater controller 220 will be described with reference to the accompanying drawings.

Figure 14:
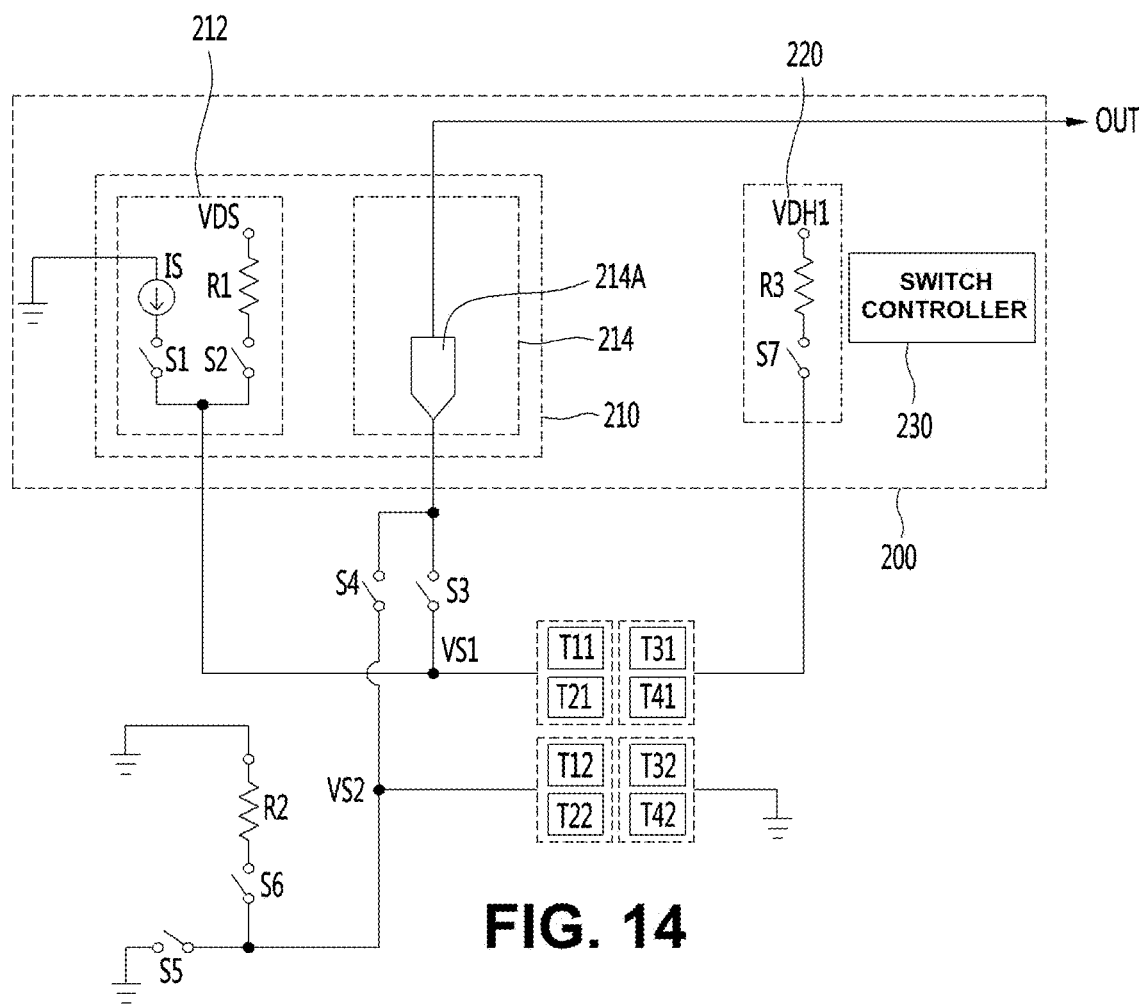
FIG. 14 is a view for explaining an operation of the camera module shown in FIG. 1 according to an embodiment.

FIG. 14 is a view for explaining an operation of the camera module shown in FIG. 1 according to an embodiment.

The temperature sensing portion 210 and the heater controller 220 shown in FIG. 14 correspond to the embodiment of the temperature sensing portion 210 and the heater controller 220 shown in FIG. 1, respectively.

The temperature sensing portion 210 may be connected to one end T11 of the first-first device 120A or one end T21 of the first-second device 120B. To this end, the temperature controller 210 may include a first temperature sensing portion connected to one end T11 of the first-first device 120A, and a second temperature sensing portion connected to one end T21 of the first-second device 120B. However, for convenience of description, only the configuration of one temperature sensing portion 210 is illustrated and described.

Accordingly, one end of the first-first device 120A or one end T21 of the first-second device 120B may be electrically connected to the temperature sensing portion 210 disposed on the main substrate (eg, 480 shown in FIG. 19) through the first connecting substrate 132.

In addition, the other end T12 of the first-first device 120A or the other end T22 of the first-second device 120B may be connected to a reference potential (eg, ground) or a resistor R2. To this end, the other end T12 of the first-first device 120A or the other end T22 of the first-second device 120B may be connected to a reference potential or resistance (R2).

The heater controller 220 may be connected to one end T31 of the second-first device 140A or one end T41 of the second-second device 140B. To this end, the heater controller 220 may be include a first heater controller connected to one end T31 of the second-first device 140A, and a second temperature sensing portion connected to one end T41 of the second-second device 140B. However, for convenience of description, only the configuration of one heater controller 220 is illustrated and described.

Accordingly, one end T31 of the second-first device 140A or one end T41 of the second-second device 140B may be electrically connected to the heater controller 220 disposed on the main substrate (eg, 480 shown in FIG. 19) through the first connecting substrate 132.

In addition, the other end T32 of the second-first device 140A or the other end T42 of the second-second device 140B may be connected to a reference potential (eg, ground). To this end, the other end T32 of the second-first device 140A or the other end T42 of the second-second device 140B may be connected to a reference potential through the first connecting substrate 132 and the main substrate.

According to an embodiment, the temperature sensing portion 210 may include a sensing driver 212 and a temperature information measuring part 214.

The sensing driver 212 serves to supply driving signals to the first devices 120A and 120B, respectively. Hereinafter, a connection relationship between the temperature sensing portion 210 and the first-first device 120A will be described. Also, the first-second device 120B may be connected to a separate temperature sensing portion in the same manner as the first-first device 120A.

For example, the sensing driver 212 may supply a driving signal through one end T11 of the first-first device 120A. The driving signal supplied from the sensing driver 212 may be in the form of current or voltage.

According to an embodiment, when the sensing driver 212 supplies a driving signal in the form of a current, the sensing driver 212 may include only a current source IS in FIG. 14.

According to another embodiment, when the sense driver 212 supplies a driving signal in the form of a voltage, the sense driver 212 may include only a supply voltage VDS and a first resistor R1 in FIG. 14.

According to another embodiment, when the sensing driver 212 selectively supplies a driving signal in a current form or a voltage form, the sensing driver 212 may include a current source IS, a supply voltage VDS, and a first resistor R1 as well as first and second switches S1 and S2, and the camera module 1000 may further include third to sixth switches S3 to S6 and a resistor R2. Turn-on and turn-off of the first to sixth switches S1 to S6 may be adjusted in the main board of the controller 200 illustrated in FIG. 1. To this end, the controller 200 may further include a separate switch controller 230. The switch controller 230 may generate and output a switch control signal for turning on or off the first to sixth switches S1 to S6.

The first switch S1 may be disposed between a constant current source IS and one end T11 of the first-first device 120A, and the second switch S2 may be disposed between the resistor R1 and one end T11 the first-first device 120A.

The third switch S3 may be disposed between the temperature information measuring part 214 and the one end T11 of one end T11 of the first-first device 120A, and the fourth switch S4 may be disposed between the temperature information measuring part 214 and the other end T12 of the first-first device 120A.

The fifth switch S5 may be disposed between the other end T12 of the first-first device 120A and the reference potential (or ground), and the sixth switch S6 may be disposed between the other end T12 of the first-first device 120A and the resistor R2.

The temperature information measuring part 214 may be connected to the first-first device 120A to measure temperature information of the temperature detecting device 120.

For example, when the sensing driver 212 supplies a driving signal in the form of a current, and the temperature information measuring part 214 may be connected to one end T11 of the first-first device 120A to measure the temperature information of the first-first device 120A. To this end, the constant current source IS may be connected to one end T11 of the first-first device 120A, and may supply a driving signal in the form of a current to one end of the first-first device 120A.

Alternatively, when the sensing driver 212 supplies a driving signal in the form of a voltage, the temperature information measuring part 214 may be connected to the other end T12 of the first-first device 120A to measure the temperature information of the first-first device 120A. To this end, the first resistor (or load resistor) R1 may be connected between a driving signal in the form of a voltage and one end T11 of the first-first device 120A.

That is, the temperature information measuring part 214 may be measured a voltage VS1 at one end T11 of the first-first device 120A or a voltage VS2 at the other end T12 of the first-first device 120A, and may be measured temperature information of the first-first device 120A from the measured voltage VS1 or VS2. To this end, the temperature information measuring part 214 may include an analog/digital converter 214A. The analog/digital converter 214A may measure the voltage VS1 or VS2, convert the measured voltage VS1 or VS2 into a digital form, and output the converted result as temperature information through the output terminal OUT.

Hereinafter, the principle of measuring the temperature information of the first-first device 120A by the temperature sensing portion 210 will be described as follows.

Figure 15:
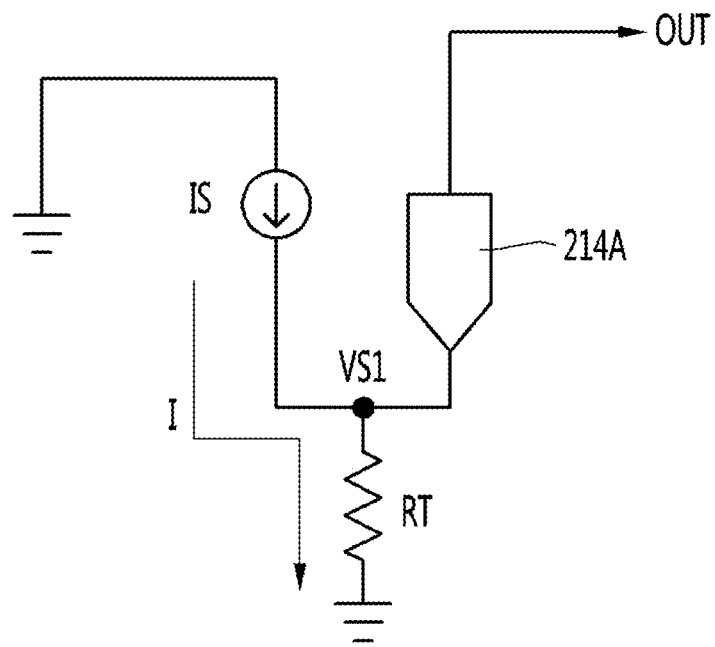
FIG. 15 shows an equivalent circuit of the camera module shown in FIG. 9 when a driving signal is supplied in the form of a current.

FIG. 15 shows an equivalent circuit of the camera module shown in FIG. 9 when a driving signal is supplied in the form of a current.

First, when the sensing driver 212 supplies a driving signal in the form of a current, the operation of the temperature information measuring part 214 will be described with reference to FIGS. 14 and 15 as follows.

The seventh switch S7 may be disposed between a resistor R3 and one end T31 of the second-first device 140A.

The first, third and fifth switches S1, S3, and S5 are turned on, and all of the other switches, the second, fourth, and sixth switches S2, S4, S6, and the seventh switch S7 are turned off. For this reason, the camera module shown in FIG. 14 may be connected as shown in FIG. 15.

Referring to FIG. 15, the current I output from the constant current source IS flows in an arrow direction. At this time, the voltage VS1 sensed by the temperature information measuring part 214 is expressed by Equation 1 below.

$$VS1 = I*RT \qquad \text{[Equation 1]}$$

Here, RT represents a resistance value RT of the first-first device 120A.

The sensed voltage VS1 of Equation 1 is converted into a digital form by the analog/digital converter 214A, and is output as temperature information of the first-first device 120A through the output terminal OUT.

The temperature of the first-first device 120A may be estimated using the temperature information output through the output terminal OUT. That is, in Equation 1, since the current I is a constant fixed value supplied from the constant current source IS, RT can be known using VS1. If the first-first device 120A is implemented as a negative thermistor having a resistance value RT that is inversely proportional to temperature, the resistance value RT decreases as the temperature increases. However, if the first-first device 120A is implemented as a positive thermistor having a resistance value RT proportional to temperature, the resistance value RT increases as the temperature increases. As described above, the digital voltage VS1 output from the temperature sensing portion 214 through the output terminal OUT may be converted into the temperature of the first-first device 120A.

Figure 16:
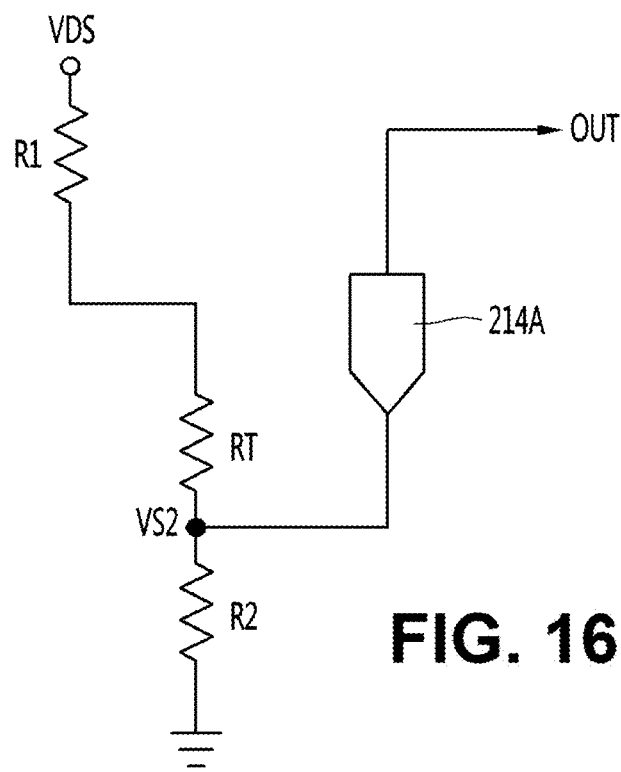
FIG. 16 shows an equivalent circuit of the camera module shown in FIG. 14 when a driving signal is supplied in the form of a voltage.

FIG. 16 shows an equivalent circuit of the camera module shown in FIG. 14 when a driving signal is supplied in the form of a voltage.

An operation of the temperature information measuring part 214 will be described with reference to FIGS. 14 and 16 as follows for a case in which the sensing driver 212 supplies a driving signal in the form of a voltage.

The second, fourth, and sixth switches S2, S4, and S6 are turned on, and the first, third, and fifth switches S1, S3, S5 and the seventh switch S7 are turned off. For this reason, the camera module shown in FIG. 14 may be connected as shown in FIG. 16.

Referring to FIG. 16, when a driving signal in the form of a voltage is applied from the supply voltage VDS through the resistor R1, the voltage V2 of the other end T12 of the first-first device 120A sensed by the temperature information measuring part 214 is expressed by Equation 2 below.

$$VS2=VDS*(R2/(RT+R2))$$ [Equation 2]

Here, RT is the resistance value RT of the first-first device 120A as described above, VDS is a fixed value as a supply voltage, and R2 is an external resistance and has a fixed resistance value.

The sensed voltage VS2 may be converted into digital form by the analog/digital converter 214A and output as temperature information of the first-first device 120A through the output terminal OUT.

The temperature of the first-first device 120A can be known using the temperature information output through the output terminal OUT. In Equation 2, since the supply voltage VD S and the second resistor R2 are fixed values, RT can be determined using VS2. If the first-first device 120A is implemented as a negative thermistor having a resistance value RT that is inversely proportional to temperature, the resistance value RT decreases as the temperature increases. However, if the first-first device 120A is implemented as a positive thermistor having a resistance value RT proportional to temperature, the resistance value RT increases as the temperature increases. As described above, the digital voltage VS2 output from the temperature sensing portion 214 through the output terminal OUT may be converted as the temperature of the first-first device 120A.

Meanwhile, the heater controller 220 is connected to the second-first device and the second-second device 140A and 140B to serve to control the heat generation of the second-first device and the second-second device 140A and 140B. To this end, the heater controller 220 may include first and second heater controllers (not shown).

Hereinafter, the operation of heating the second-first device and the second-second device 140A and 140B in the heater controller 220 will be described as follows.

When it is desired to heat the second-first device 140A, only the switch S7 in FIG. 14 is turned on, and the other switches S1 to S6 are turned off, so that the second-first device 140A may generate heat. Also, when it is desired to heat the second-second device 140B, only the switches constituting the second heater controller may be turned on, and all other switches may be turned off.

Also, in some cases, the second-first device 140A and the second-second device 140B may be simultaneously driven to generate heat at the same time.

The switch controller 230 may generate and output a switch control signal for turning on or off the seventh switch S7.

The switch controller 230 shown in FIG. 14 turns on/off the switches S1 to S8 for each operation as shown in Table 1 below. Here, S8 may be a switch included in the second heater controller that controls the operation of the second-second device 140B.

TABLE 1

| division | OP1 | OP2 | OP3 | OP4 | OP5 |
|---|---|---|---|---|---|
| S1 | 1 | 0 | 0 | 0 | 0 |
| S2 | 0 | 1 | 0 | 0 | 0 |
| S3 | 1 | 0 | 0 | 0 | 0 |
| S4 | 0 | 1 | 0 | 0 | 0 |
| S5 | 1 | 0 | 0 | 0 | 0 |
| S6 | 0 | 1 | 0 | 0 | 0 |
| S7 | 0 | 0 | 1 | 0 | 1 |
| S8 | 0 | 0 | 0 | 1 | 1 |

Figure 18:
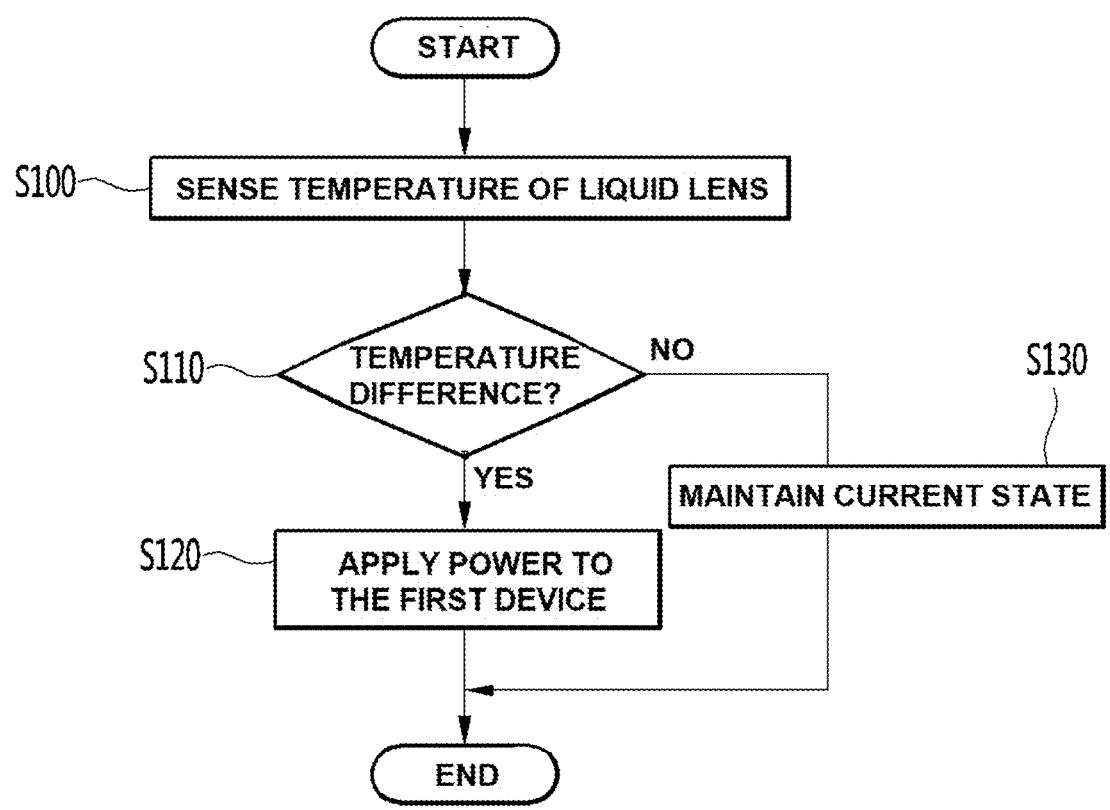
FIG. 18 is a flowchart for describing a method of controlling a camera module according to an embodiment.

In Table 1, OP1 means a switching operation for sensing the temperature of the liquid lens 110 when a driving signal in the form of a current is applied, OP2 means a switching operation for sensing the temperature of the liquid lens 110 when a driving signal in the form of a voltage is applied, OP3 means a switching operation when only the second-first device 140A heats up, OP4 means a switching operation when only the second-second device 140B heats up, and OP5 means a switching operation when both the second-first and second-second devices 140A and 140B generate heat. In Table 1, '0' indicates that the corresponding switch is turned off, and '1' indicates that the corresponding switch is turned on. Hereinafter, a control method of the above-described camera module 1000 will be described with reference to FIGS. 1, 14 and 18. FIG. 18 is a flowchart for describing a method of controlling a camera module according to an embodiment.

Referring to FIG. 18, firstly, the temperature of the liquid lens 110 is sensed (S100). S100 may be performed in the first devices 120A and 120B. In order to sense the temperature of the liquid lens 110, the switching controller 230 turns off the seventh and eighth switches S7 and S8 and controls the switching operations of the first to sixth switches S1 to S6 to measure the temperature information of the first device 120A and 120B. This operation is the same as described above.

After S100, a difference between the sensed temperature and the set target temperature of the liquid lens 110 is detected (step S110). S110 may be performed by the controller 200. For example, S110 may be performed by the switch controller 230.

When there is a difference between the sensed temperature and the set target temperature of the liquid lens 110, power is applied to the second device 140 (S120).

In this case, when the temperature difference is large, the switching controller 230 may generate a switch control signal so that the seventh and eighth switches S7 and S8 are simultaneously turned on. Accordingly, the heater controller 220 may heat the liquid lens 110 within a short time by simultaneously heating the second-first and second-second devices 140A and 140B.

However, when the temperature difference is not large, the switching controller 230 may generate a switch control signal such that only one of the seventh and eighth switches S7 and S8 is turned on. Accordingly, the heater controller 220 may heat the liquid lens 110 by heating any one of the second-first and second-second devices 140A and 140B.

In addition, if there is no difference between the sensed temperature and the set target temperature of the liquid lens 110, a current state is maintained (S130). To this end, the switching controller 230 may generate a switch control signal to turn off both the seventh and eighth switches S7 and S8. Accordingly, neither of the second-first and second-second devices 140A and 140B is heated.

On the other hand, according to the embodiment as described above, the first devices 120A and 120B) and the second devices 140A and 140B is composed of a plurality, respectively, accordingly, a plurality of the temperature sensing portion 210 and the heater controller 220 had to be configured.

Alternatively, in the embodiment, the first devices 120A and 120B and the second devices 140A and 140B may be collectively controlled using one temperature sensing portion 210 and one heater controller 220.

Figure 17:
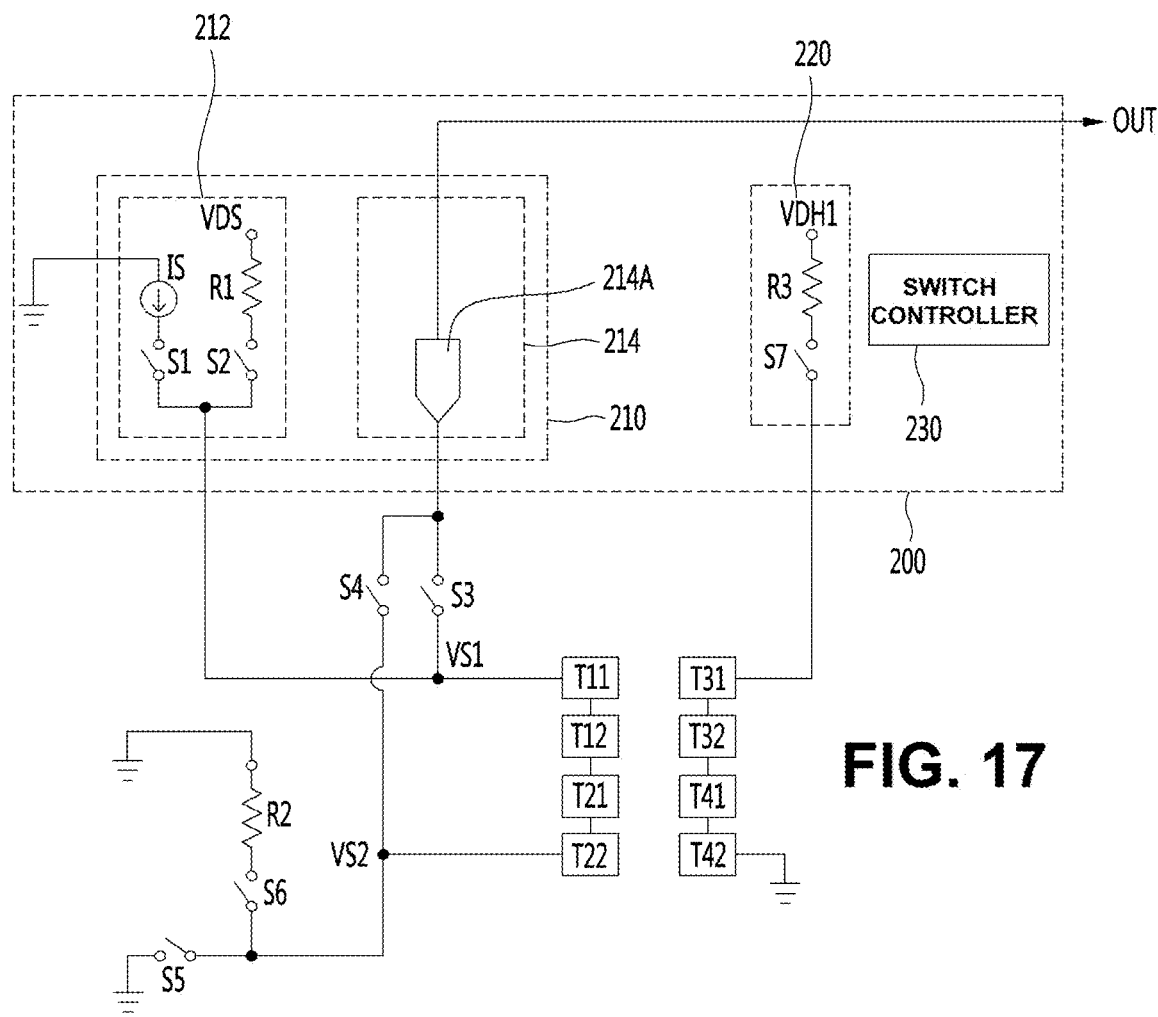
FIG. 17 is a view for explaining an operation of the camera module shown in FIG. 1 according to an embodiment.

FIG. 17 is a view for explaining an operation of the camera module shown in FIG. 1 according to an embodiment.

Referring to FIG. 17, the plurality of first devices 120A and 120B may be connected to each other. That is, the other end T12 of the first-first device 120A and the end T21 of the first-second device 120B may be connected to each other. For this, the first connecting substrate 132 may include a connection pattern (not shown) for electrically connecting the other end T12 of the first-first device 120A and the end T21 of the first-second device 120 to each other.

Accordingly, although the first devices (120A, 120B) are configured of a plurality, the plurality of first devices 120A and 120B may constitute one resistor or thermistor through the connection pattern.

Accordingly, one end T11 of the first-first device 120A may be electrically connected to the temperature sensing portion 210 disposed on the main substrate (eg, 480 illustrated in FIG. 19) through the first connecting substrate 132. In addition, the other end T12 of the first-first device 120A and the end T21 of the first-second device 120B may be electrically connected to each other.

Also, the other end T12 of the first-second device 120B may be connected to a reference potential (eg, ground) or a resistor R2. To this end, the other end T22 of the first-second device 120B may be connected to a reference potential or a resistor R2 through the first connecting substrate 132 and the main substrate.

Accordingly, one temperature sensing portion 210 may sense the integrated temperature of the plurality of first devices 120A and 120B connected to each other.

Also, the plurality of second device 140A and 140B may be connected to each other. That is, the other end T32 of the second-first device 140A and one end T41 of the second-second device 140B may be connected to each other. For this, the first connecting substrate 132 may include a connection pattern (not shown) for electrically connecting the other end T32 of the second-first device 140A and one end T41 of the second-second device 140B to each other.

Accordingly, although a plurality of second devices 140A and 140B are formed, a single conductor having a resistance component may be formed through the connection pattern.

The heater controller 220 may be connected to one end T31 of the second-first device 140A. In addition, the other end T32 of the second-first device 140A and one end T41 of the second-second device 140B may be connected to each other. In addition, the other end T42 of the second-second device 140B may be connected to a reference potential (eg, ground). To this end, the other end T42 of the second-second device 140B may be connected to a reference potential through the first connecting substrate 132 and the main substrate.

Accordingly, one heater controller 220 includes a single switch, and can simultaneously control a plurality of interconnected second devices 140A and 140B using this switch.

Hereinafter, an embodiment of the camera module 1000 according to the above-described embodiment will be described with reference to the accompanying FIGS. 19 and 20 as follows.

Figure 19:
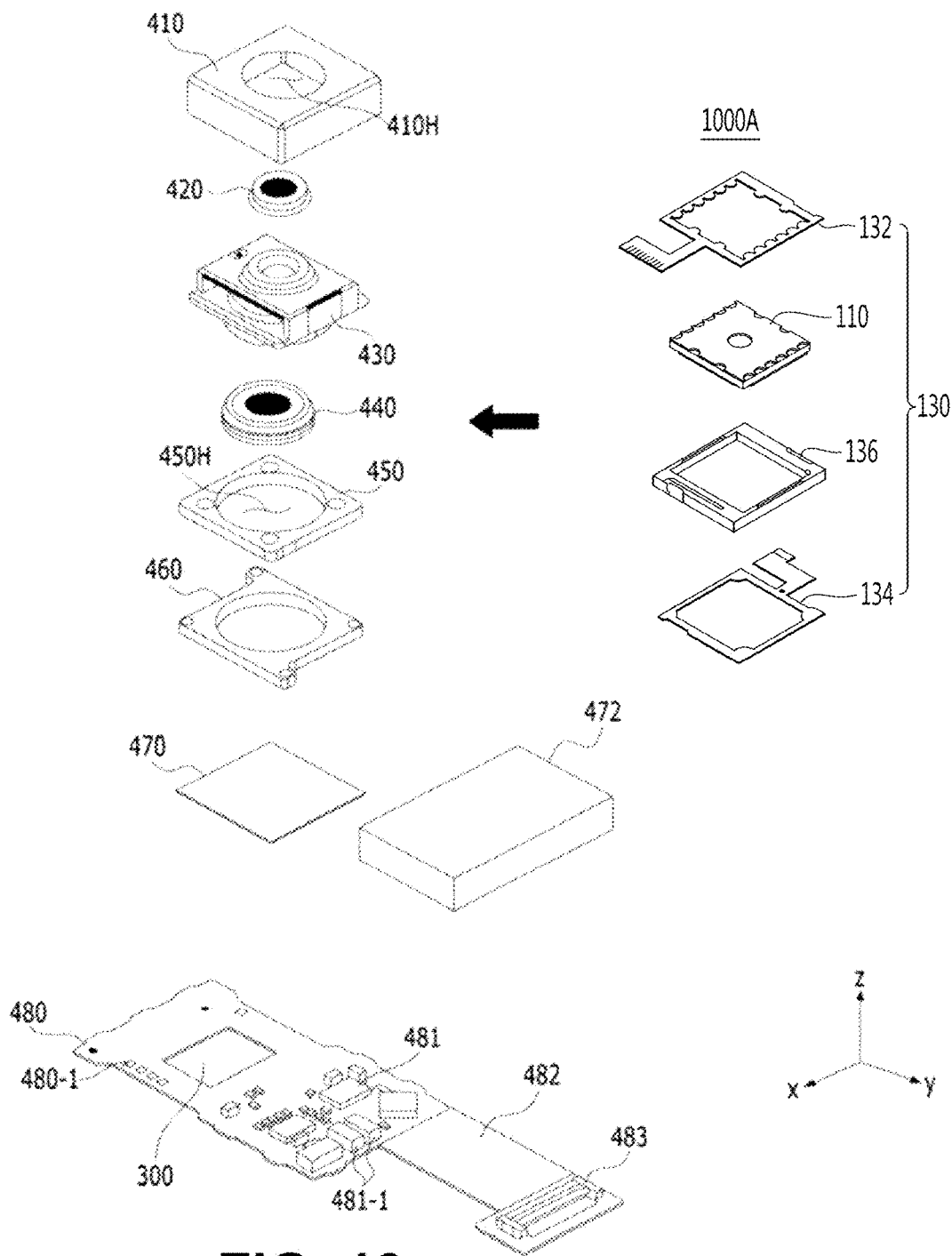
FIG. 19 is an exploded perspective view of the camera module shown in FIG. 1 according to an embodiment.

FIG. 19 is an exploded perspective view showing an embodiment 1000A of the camera module 1000 shown in FIG. 1.

Referring to FIG. 19, the camera module 1000A may include a lens assembly, an image sensor 300, and a main board 480. Here, the lens assembly, the image sensor 300, and the main board 480 correspond to the embodiments of the lens assembly, the image sensor 300 and the controller 200 shown in FIG. 1, respectively.

In addition, the camera module 1000A may further include a first cover 410 and a middle base 450. In addition, the camera module 1000A may further include a sensor base 460 and a filter 470. In addition, the camera module 1000A may further include a circuit cover 472. The circuit cover 472 may serve as an electromagnetic shielding function.

According to an embodiment, at least one of the components 420 to 470 of the camera module 1000A shown in FIG. 19 may be omitted. Alternatively, at least one component different from the components 420 to 470 shown in FIG. 19 may be further added and included in the camera module 1000A.

Referring to FIG. 19, the lens assembly may include at least one of a liquid lens module 130, a first lens part 420, a holder 430, and a second lens part 440, and dispose on the main substrate 480.

In order to distinguish it from the liquid lens 110 in the lens assembly, the first lens part 420 and the second lens part 440 may be referred to as 'first solid lens part' and 'second solid lens part', respectively.

The first lens part 420 is disposed on the upper side of the lens assembly, and may be a region into which light is incident from the outside of the lens assembly. That is, the first lens part 420 may be disposed on the liquid lens module 130 in the holder 430. The first lens part 420 may be implemented as a single lens, or may be implemented as two or more lenses aligned with respect to a central axis to form an optical system. Here, the central axis may mean the optical axis LX of the optical system formed by the first lens part 420, the liquid lens module 130, and the second lens part 440 included in the camera module 1000A or may mean an axis parallel to the optical axis LX. The optical axis LX may correspond to the optical axis of the image sensor 300. That is, the first lens part 420, the liquid lens module 130, the second lens part 440, and the image sensor 300 are aligned along the optical axis LX through active alignment (AA) and disposed. Here, the active alignment means that the optical axes of the first lens part 420, the second lens part 440, and the liquid lens module 130 are aligned to obtain a better image, and it may refer to an operation of adjusting an axial or distance relationship between the image sensor 300, the lens parts 420 and 440, and the liquid lens module 130.

Figure 20:
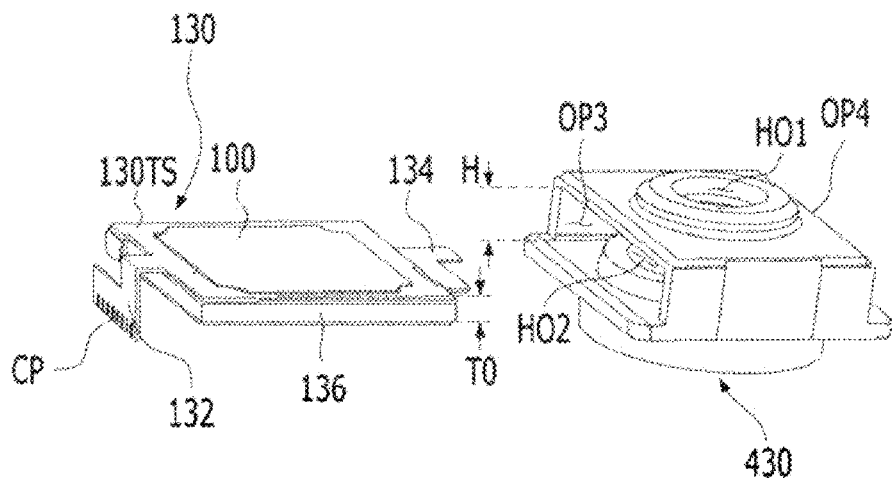
FIG. 20 is a view for explaining the holder and the liquid lens module shown in FIG. 19.

FIG. 20 is a view for explaining the holder 430 and the liquid lens module 130 shown in FIG. 19. That is, FIG. 20 shows an exploded perspective view of the holder 430 and the liquid lens 130. The holder 430 illustrated in FIG. 20 may include first and second holes HO1 and HO2 and first to fourth sidewalls.

The first and second holes HO1 and HO2 may be respectively formed in the upper and lower portions of the holder 430 to open the upper and lower portions of the holder 430, respectively. Here, the first hole HO1 and the second hole HO2 may be through holes. The first lens part 420 may be received, mounted, seated, contacted, fixed, temporarily fixed, supported, coupled, or disposed in the first hole HO1 formed in the holder 430, and the second lens part 440 may be received, mounted, seated, contacted, fixed, temporarily fixed, supported, coupled, or disposed in the second hole HO2 formed in the holder 430.

In addition, the first and second sidewalls of the holder 430 are disposed to face each other in a direction perpendicular to the optical axis (LX) direction (eg, the x-axis direction), and the third and fourth sidewalls are disposed to face each other in a direction perpendicular to the x-axis direction the optical axis (LX) direction (eg, a y-axis direction). In addition, as illustrated in FIG. 14, the first sidewall in the holder 430 includes a third opening OP3, and the second sidewall has a fourth opening OP4 having the same shape as or similar to the third opening OP3. Accordingly, the third opening OP3 disposed on the first sidewall and the fourth opening OP4 disposed on the second sidewall may be disposed to face each other in a direction perpendicular to the optical axis LX direction (eg, the x-axis direction).

An inner space of the holder 430 in which the liquid lens module 130 is to be disposed may be opened by the third and fourth openings OP3 and OP4. At this time, the liquid lens module 130 may be inserted through the third or fourth openings OP3 and OP4 to be mounted, seated, contacted, fixed, temporarily fixed, supported, coupled, or disposed in the inner space of the holder 430. For example, the liquid lens module 130 may be inserted into the inner space of the holder 430 through the third opening OP3.

In this way, so that the liquid lens module 130 can be inserted into the holder 430 internal space through the third or fourth openings OP3 and OP4, the size of each of the third or fourth openings OP3 and OP4 of the holder 430 with respect to the optical axis LX direction may be greater than the cross-sectional area of the liquid lens module 130 in the y-axis and z-axis directions. For example, the height H corresponding to the size of each of the third and fourth openings OP3 and OP4 in the optical axis LX direction may be greater than the thickness TO of the liquid lens module 130.

The second lens part 440 may be disposed under the liquid lens module 130 in the holder 430. The second lens part 440 may be disposed to be spaced apart from the first lens part 420 in the optical axis direction (eg, the z-axis direction).

Light incident to the first lens part 420 from the outside of the camera module 1000A may pass through the liquid lens module 130 and may be incident to the second lens part 440. The second lens part 440 may be implemented as a single lens, or may be implemented as a plurality of lenses arranged with respect to a central axis to form an optical system.

Unlike the liquid lens module 130, each of the first lens part 420 and the second lens part 440 is a solid lens, and may be implemented with glass or plastic, but the embodiment is not limited to a specific material of each of the first lens part 420 and the second lens part 440.

Referring back to FIG. 19, the first cover 410 is disposed to surround the holder 430, the liquid lens module 130 and the middle base 450, and may protect these 430, 130, 450 from external impacts. In particular, by disposing the first cover 410, it is possible to protect the plurality of lenses forming the optical system from external impact.

In addition, the first cover 410 may include an upper opening 410H formed in an upper surface of the first cover to be exposed the first lens part 420 from external light.

Also, the first cover 410 may be disposed to cover the upper surface of the holder 430 and the first to fourth sidewalls.

Also, the middle base 450 may be disposed while surrounding the second hole HO2 of the holder 430. To this end, the middle base 450 may include a receiving hole 450H for receiving the second hole HO2.

Like the upper opening 410H of the first cover 410, the receiving hole 450H may be formed at a position corresponding to the position of the image sensor 300 disposed in the camera module 1000A near the center of the middle base 450.

The middle base 450 may be mounted on the main board 480 while being spaced apart from the circuit device 481 on the main board 480. That is, the holder 430 may be disposed on the main substrate 480 to be spaced apart from the circuit device 481.

The main board 480 is disposed under the middle base 450, and may include a groove, a circuit device 481, a connecting portion (or FPCB) 482 and a connector 483 in which the image sensor can be mounted, seated, contacted, fixed, temporarily fixed, supported, coupled, or received.

The circuit device 481 of the main board 480 may constitute a control module for controlling the liquid lens module 130 and the image sensor 300. The circuit device 481 may include at least one of a passive device and an active device, and may have various widths and heights. The circuit device 481 may be plural, and may protrude to the outside while having a height higher than that of the main board 480. The plurality of circuit devices 481 may be disposed so as not to overlap the holder 430 in a direction parallel to the optical axis LX. For example, the plurality of circuit devices 481 may include a power inductor and a gyro sensor, but the embodiment is not limited to a specific type of the circuit device 481.

Also, the circuit device 481 may calculate the temperature of the first devices 120A and 120B using the voltage values VS1 and VS2 output through the output terminal OUT shown in FIG. 1, and may be externally transmit the calculated temperature through the connector 483. In addition, the circuit device 481 may include the first to eighth switches (S1 to S8) shown in FIG. 14, it may also serve as the switch controller 230 to control the turn-on or turn-off of these (S1 to S8).

The main substrate 480 may include a holder region in which the holder 430 is disposed and a device region in which a plurality of circuit devices 481 are disposed.

The main board 480 may be implemented as a Rigid Flexible Printed Circuit Board (RFPCB) including the FPCB 482. The FPCB 482 may be bent as required by a space in which the camera module 1000A is mounted.

Meanwhile, the connector 483 may electrically connect the main board 480 to an external power source or other device (eg, an application processor) of the camera module 1000A.

Meanwhile, some of the plurality of circuit devices 481 illustrated in FIG. 19 may cause electromagnetic interference (EMI) or noise. In particular, the power inductor 481-1 among the plurality of circuit devices 481 may cause more EMI than other devices. As such, in order to block EMI or noise, the circuit cover 472 may be disposed to cover the circuit device 481 disposed in the device region of the main board 480.

Also, when the circuit cover 472 is disposed to cover the circuit device 481, the circuit device 481 disposed on the main board 480 may be protected from external impact. To this end, the circuit cover 472 may include a receiving space for receiving and covering the circuit device 481 in consideration of the shape and position of the circuit device 481 disposed on the main board 480.

Meanwhile, the filter 470 may filter light corresponding to a specific wavelength range with respect to the light passing through the first lens part 420, the liquid lens module 130, and the second lens part 440. The filter 470 may be an infrared (IR) blocking filter or an ultraviolet (UV) blocking filter, but the embodiment is not limited thereto. The filter 470 may be disposed on the image sensor 300. The filter 470 may be disposed inside the sensor base 460.

The sensor base 460 may be disposed under the middle base 450 and attached to the main board 480. The sensor base 460 may surround the image sensor 300 and protect the image sensor 300 from external foreign substances or impact.

The main board 480 is disposed below the sensor base 460, the sensor base 460 is spaced apart from the circuit device 481 and mounted on the main board 480, and the holder 430 in which the middle base 450, the second lens part 440, the liquid lens module 130, and the first lens part 420 are disposed may be disposed on the sensor base 460.

Hereinafter, the camera module according to the comparative example and the embodiment will be described by comparing it as follows. Here, the referenced comparative examples are merely illustrated to help the understanding of the effect of the camera module according to the embodiment.

Figure 21A:
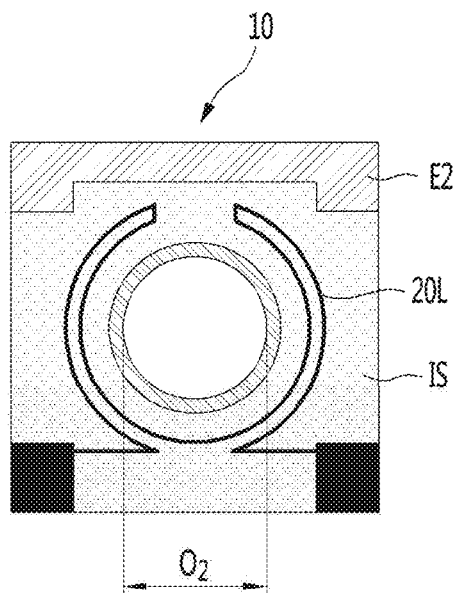
FIGS. 21 (a) and 21 (b) show a local plan view of a camera module according to a comparative example.
Figure 21B:
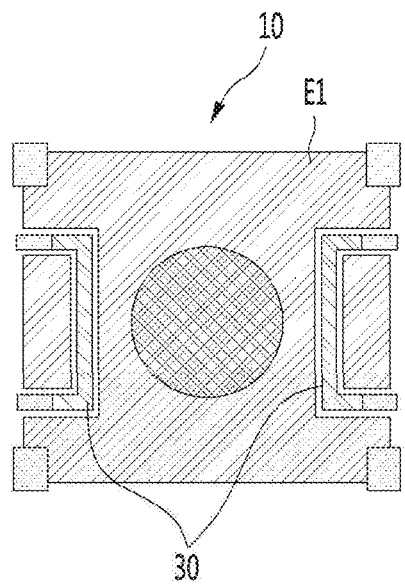

FIGS. 21 (*a*) and 21 (*b*) show a local plan view of a camera module according to a comparative example.

The camera module according to the comparative example shown in FIGS. 21 (*a*) and (*b*) includes a liquid lens 10, a thermistor 20 and a heater 30.

The liquid lens 10 may include a first electrode E1 as an individual electrode, a second electrode E2 as a common electrode, and an insulating layer IS. Here, the first electrode E1, the second electrode E2, and the insulating layer IS are corresponded to each of the first electrode E1, the second electrode E2, and the insulating layers IS1 and IS2 according to the above-described embodiment. The insulating layer IS may be omitted. The thermistor 20 performs the same role used to sense the temperature of the liquid lens 10 as the temperature detection device 120 according to the above-described embodiment. Also, the heater 30 serves to heat the liquid lens 10 like the second devices 140A and 140B according to the above-described embodiment.

The thermistor 20 according to the comparative example shown in IGS. 21 (*a*) and 21 (*b*) is on the surface on which the second electrode E2 is disposed in the liquid lens 10 (eg, corresponding to the second surface SF2 shown in FIG. 4). On the other hand, the heater 30 is disposed on the surface on which the first electrode E1 is disposed (eg, corresponding to the second surface SF2 shown in FIG. 4). As described above, since the thermistor 20 is disposed on the second surface SF2 having a smaller area than the first surface SF1, the length of the line 20L of the pattern of the thermistor 20 becomes longer, and the line 20L the distance between them becomes narrower. For this reason, in the comparative example, the line 20L may be deformed by heat, the structural design may be complicated, and the manufacturing process may be difficult. In addition, since the thermistor 20 is disposed on the second surface SF2 on which the common electrode is disposed, the thermistor 20 may affect the common electrode and cause operational problems.

On the other hand, in the case of the camera module (1000, 1000A) according to the embodiment, the first devices 120A and 120B and the second devices 140A and 140B are all disposed on the first surface SF1 that is wider than the second surface SF2 of the liquid lens 110. Accordingly, there is no need to implement a longer length between the lines of the first devices 120A and 120B, and the distance between the lines may be wider than that of the comparative example illustrated in FIGS. 21 (*a*) and 21 (*b*). Accordingly, compared with the comparative example, the first devices 120A and 120B according to the embodiment are less likely to be deformed by heat, and the structural design may be simplified, and the manufacturing process may be facilitated. In addition, according to the embodiment, since the first devices 120A and 120B and the second devices 140A and 140B are not disposed on the second surface SF2 on which the common electrode E2 is disposed, since it does not have any effect on the common electrode, which is the reference electrode, stability of operation may be secured.

Although only a few have been described as described above in relation to the embodiments, various other forms of implementation are possible. The technical contents of the above-described embodiments may be combined in various forms unless they are incompatible with each other, and may be implemented as a new embodiment through this.

Meanwhile, an optical device may be implemented using the camera modules 1000 and 1000A including the liquid lens according to the above-described embodiment. Here, the optical device may include a device capable of processing or analyzing an optical signal. Examples of optical devices may include a camera/video device, a telescope device, a microscope device, an interferometer device, a photometric device, a polarimeter device, a spectrometer device, a reflectometer device, an autocollimator device, a lens meter device, and the like, and this embodiment may be applied to an optical device that may include a lens assembly.

Meanwhile, the optical device may be implemented as a portable device such as a smart phone, a notebook computer, or a tablet computer. These optical devices may include a camera module (1000, 1000A), a display part (not shown) for outputting an image, a battery (not shown) for supplying power to the camera module (1000, 1000A) and a body housing in which the display part and the battery are mounted. The optical device may further include a communication module capable of communicating with other devices, and a memory capable of storing data. The communication module and the memory may also be mounted in the main body housing.

It is apparent to those skilled in the art that the present invention may be embodied in other specific forms without departing from the spirit and essential characteristics of the present invention. Accordingly, the above detailed description should not be construed as restrictive in all respects but as exemplary. The scope of the present invention should be determined by a reasonable interpretation of the appended claims, and all modifications within the equivalent scope of the present invention are included in the scope of the present invention.

The invention claimed is:

1. A liquid lens comprising:
a first plate having a cavity for receiving a first liquid and a second liquid;
a first electrode disposed on a first surface of the first plate;
a second electrode disposed on a second surface of the first plate facing the first surface; and
a temperature device disposed on the first surface of the first plate to be spaced apart from the first electrode;
wherein the first electrode includes first to eighth individual electrodes sequentially arranged along a circumferential direction about an optical axis,
wherein the first surface of the first plate includes:
a first region and a second region disposed facing each other in a first horizontal direction with respect to a center of the cavity, and
a third region and a fourth region disposed between the first region and the second region and facing each other in a second horizontal direction perpendicular to the first horizontal direction with respect to the center of the cavity,
wherein the temperature device includes a temperature sensor group and a heater group disposed between at least two of the first to eighth individual electrodes,
wherein the temperature sensor group includes a first temperature sensor disposed in the first region and a second temperature sensor disposed in the second region,
wherein the heater group includes a first heater disposed in the third region and a second heater disposed in the fourth region,
wherein the first temperature sensor and the second temperature sensor are disposed to face each other in the first horizontal direction with respect to the center of the cavity, and
wherein the first heater and the second heater are disposed to face each other in the second horizontal direction with respect to the center of the cavity.

2. The liquid lens of claim 1,
wherein an area of the first surface is greater than an area of the second surface.

3. The liquid lens of claim 2, wherein the first to eighth individual electrodes include:
a first group of four individual electrodes disposed in the first region; and
a second group of four individual electrodes disposed in the second region.

4. The liquid lens of claim 2, wherein the first to eighth individual electrodes include:
a first group of two individual electrodes disposed in the first region,
a second group of two individual electrodes disposed in the second region,
a third group of two individual electrodes disposed in the third region, and
a fourth group of two individual electrodes disposed in the fourth region.

5. A camera module comprising:
a holder including a solid lens;
a liquid lens coupled to the holder;
a main board connected to the liquid lens and comprising a controller for controlling the liquid lens; and
an image sensor disposed on the main board at a position corresponding to that of the liquid lens,
wherein the liquid lens comprises:
a first plate having a cavity for receiving a first liquid and a second liquid;
a first electrode disposed on a first surface of the first plate;
a second electrode disposed on a second surface of the first plate facing the first surface; and
a temperature device disposed on the first surface of the first plate to be spaced apart from the first electrode;
wherein the first surface of the first plate includes:
a first region and a second region disposed facing each other in a first horizontal direction with respect to a center of the cavity, and
a third region and a fourth region disposed between the first region and the second region and facing each other in a second horizontal direction perpendicular to the first horizontal direction with respect to the center of the cavity,
wherein the temperature device includes a temperature sensor group and a heater group disposed between at least two of the first to eighth individual electrodes,
wherein the temperature sensor group includes a first temperature sensor disposed in the first region and a second temperature sensor disposed in the second region,
wherein the heater group includes a first heater disposed in the third region and a second heater disposed in the fourth region,
wherein the first temperature sensor and the second temperature sensor are disposed to face each other in the first horizontal direction with respect to the center of the cavity,
wherein the first heater and the second heater are disposed to face each other in the second horizontal direction with respect to the center of the cavity, and
wherein the controller includes a temperature sensing portion connected to the first temperature sensor and the second temperature sensor to sense the temperature of the liquid lens and a heater controller connected to the first heater and the second heater.

6. The camera module of claim 5, wherein at least one of the first temperature sensor and the second temperature sensor includes one end connected to the temperature sensing portion and an other end connected to a reference potential, and
wherein at least one of the first heater and the second heater includes one end connected to the heater controller and an other end connected to the reference potential.

7. The camera module of claim 6, wherein the temperature sensing portion includes:
a sensing driver configured to supply a driving signal to the one end of at least one of the first temperature sensor and the second temperature sensor; and
a temperature information measuring part connected to the one end of at least one of the first temperature sensor and the second temperature sensor to measure temperature information of at least one of the first temperature sensor and the second temperature sensor.

8. The camera module of claim 6,
wherein one end of the first temperature sensor is connected to the temperature sensing portion, wherein an other end of the first temperature sensor is connected to one end of the second temperature sensor, and wherein an other end of the second temperature sensor is connected to the reference potential.

9. The camera module of claim 6, wherein one end of the first heater is connected to the heater controller, wherein an other end of the first heater is connected to one end of the second heater, and wherein an other end of the second heater is connected to the reference potential.

10. The camera module of claim 7, wherein the sensing driver includes at least one of a current source configured to supply the driving signal in a form of a current to be connected to the one end of at least one of the first temperature sensor and the second temperature sensor and a load resistor connected between the driving signal in a form of a voltage and the one end of at least one of the first temperature sensor and the second temperature sensor.

11. The camera module of claim 5, wherein an area of the first surface is greater than an area of the second surface.

12. The camera module of claim 11, wherein the first to eighth individual electrodes include:

a first group of four individual electrodes disposed in the first region; and a second group of four individual electrodes disposed in the second region.

13. The camera module of claim 11, wherein the first to eighth individual electrodes include:

a first group of two individual electrodes disposed in the first region, a second group of two individual electrodes disposed in the second region, a third group of two individual electrodes disposed in the third region, and a fourth group of two individual electrodes disposed in the fourth region.

* * * * *